US012701213B2

(12) United States Patent
Dai et al.

(10) Patent No.: US 12,701,213 B2
(45) Date of Patent: *Aug. 4, 2026

(54) SYSTEM AND METHOD FOR DETERMINING VIDEO CODEC PERFORMANCE IN REAL-TIME COMMUNICATION OVER INTERNET

(71) Applicant: Agora Lab, Inc., Santa Clara, CA (US)

(72) Inventors: Wei Dai, Shanghai (CN); Sheng Zhong, Santa Clara, CA (US); Tao Duan, Shanghai (CN); Zesen Zhuang, Shanghai (CN); Xiajun Gu, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/790,900

(22) Filed: Jul. 31, 2024

(65) Prior Publication Data

US 2024/0397034 A1 Nov. 28, 2024

Related U.S. Application Data

(63) Continuation of application No. 18/093,788, filed on Jan. 5, 2023, now Pat. No. 12,101,458.

(60) Provisional application No. 63/311,205, filed on Feb. 17, 2022.

(51) Int. Cl.
| | |
|---|---|
| *H04L 65/80* | (2022.01) |
| *H04N 17/00* | (2006.01) |
| *H04N 19/124* | (2014.01) |
| *H04N 19/89* | (2014.01) |

(52) U.S. Cl.
CPC ........... *H04N 17/00* (2013.01); *H04N 19/124* (2014.11); *H04N 19/89* (2014.11)

(58) Field of Classification Search
CPC ...... H04N 17/00; H04N 19/124; H04N 19/89; H04N 19/159; H04N 19/164; H04N 19/172; H04L 65/80
See application file for complete search history.

(56) References Cited

U.S. PATENT DOCUMENTS

| | | | | |
|---|---|---|---|---|
| 2006/0146830 A1* | 7/2006 | Lin | ...................... | H04N 19/103 |
| | | | | 375/E7.262 |
| 2023/0421626 A1* | 12/2023 | Zhong | ...................... | H04L 1/16 |

\* cited by examiner

*Primary Examiner* — Howard D Brown, Jr.
(74) *Attorney, Agent, or Firm* — The Law Offices of Konrad Sherinian LLC; Depeng Bi

(57) ABSTRACT

A system for determining the performance of a video codec for real-time communication applications includes a video codec performance evaluation network model and video codec quality analyze. A set of network conditions is used to simulate certain typical real-world network conditions. A coded video stream is transmitted from the transmitting end to the receiving end under these conditions. The end-to-end latency and received video fluency are measured along with a set of existing video quality measures by a video codec performance evaluation system including a network model and a video codec quality analyzer. The decodable frame ratio, latency and video fluency are used as the performance metrics for real-time communication video quality evaluation. The video codec performance evaluation system does not send any video data over a network when it determines the real-time communication quality of the video codec.

17 Claims, 9 Drawing Sheets

104

302

108

700

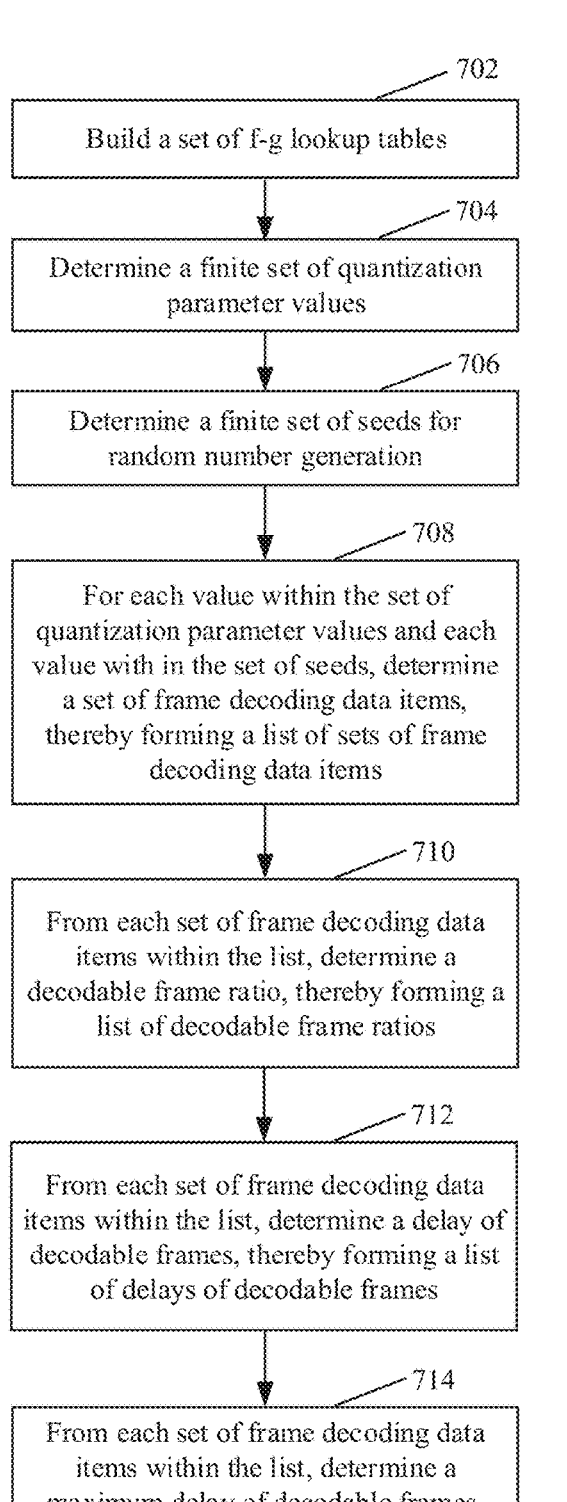

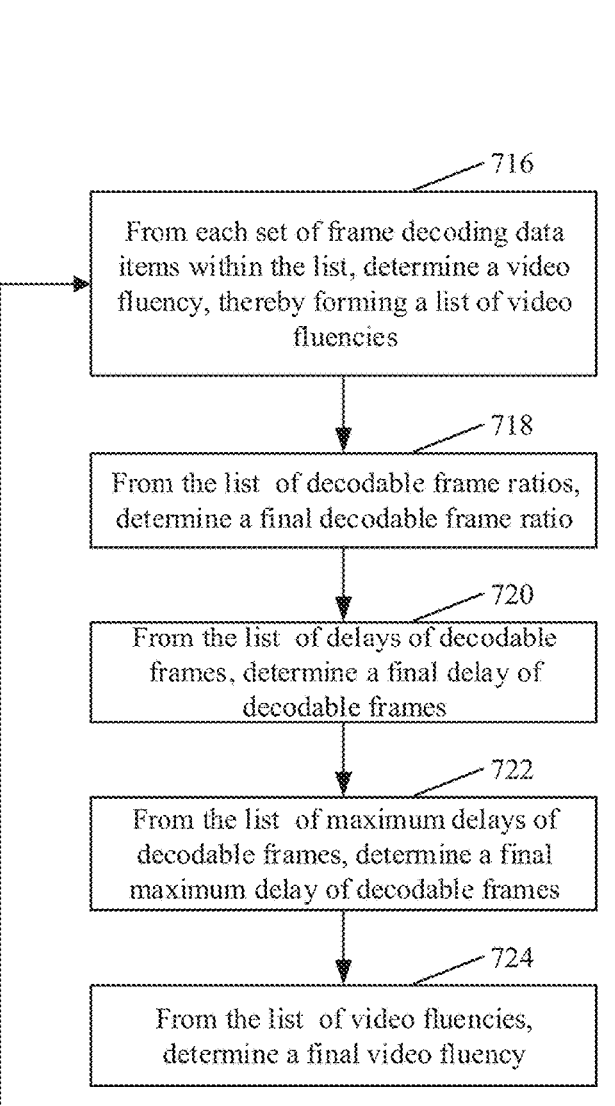

702
Build a set of f-g lookup tables

704
Determine a finite set of quantization parameter values

706
Determine a finite set of seeds for random number generation

708
For each value within the set of quantization parameter values and each value with in the set of seeds, determine a set of frame decoding data items, thereby forming a list of sets of frame decoding data items 710
From each set of frame decoding data items within the list, determine a decodable frame ratio, thereby forming a list of decodable frame ratios 712
From each set of frame decoding data items within the list, determine a delay of decodable frames, thereby forming a list of delays of decodable frames 714
From each set of frame decoding data items within the list, determine a maximum delay of decodable frames, thereby forming a list of maximum delays of decodable frames 716
From each set of frame decoding data items within the list, determine a video fluency, thereby forming a list of video fluencies 718
From the list of decodable frame ratios, determine a final decodable frame ratio 720
From the list of delays of decodable frames, determine a final delay of decodable frames 722
From the list of maximum delays of decodable frames, determine a final maximum delay of decodable frames 724
From the list of video fluencies, determine a final video fluency

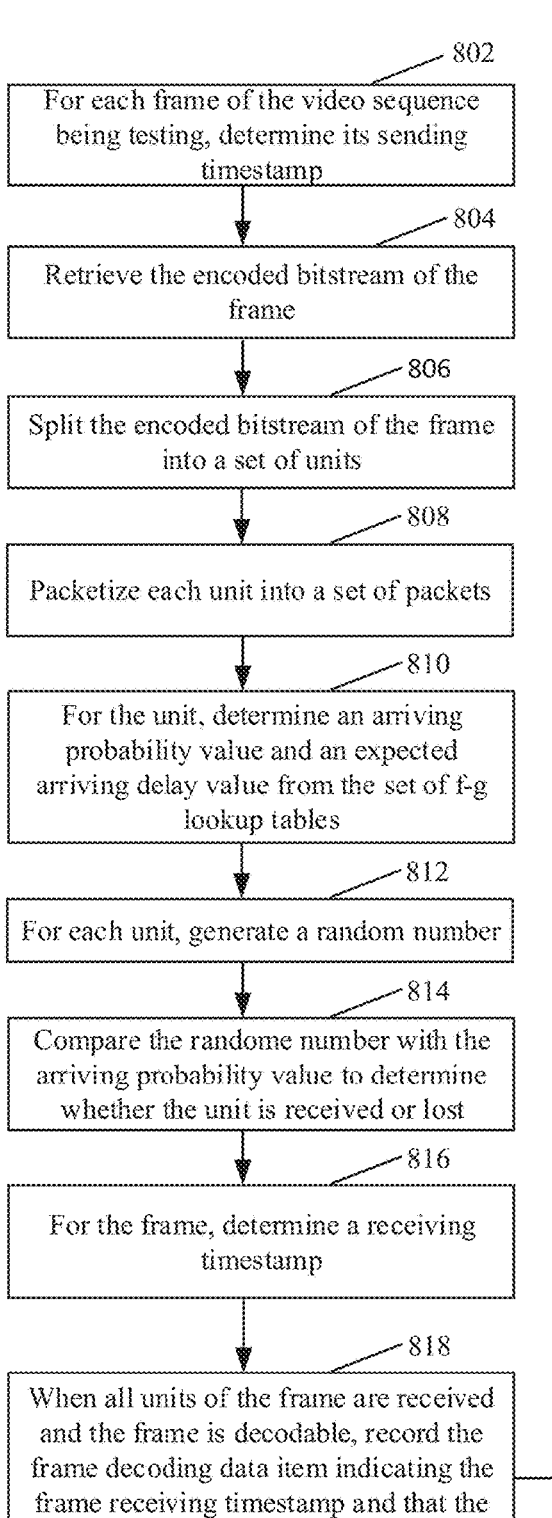

802
For each frame of the video sequence being testing, determine its sending timestamp 804
Retrieve the encoded bitstream of the frame 806
Split the encoded bitstream of the frame into a set of units 808
Packetize each unit into a set of packets 810
For the unit, determine an arriving probability value and an expected arriving delay value from the set of f-g lookup tables 812
For each unit, generate a random number 814
Compare the randome number with the arriving probability value to determine whether the unit is received or lost 816
For the frame, determine a receiving timestamp 818
When all units of the frame are received and the frame is decodable, record the frame decoding data item indicating the frame receiving timestamp and that the frame is decodable 820
When not all units of the frame are received or the frame is not decodable, record the frame decoding data item indicating the frame receiving timestamp and that the frame is not decodable

Figure 8

900
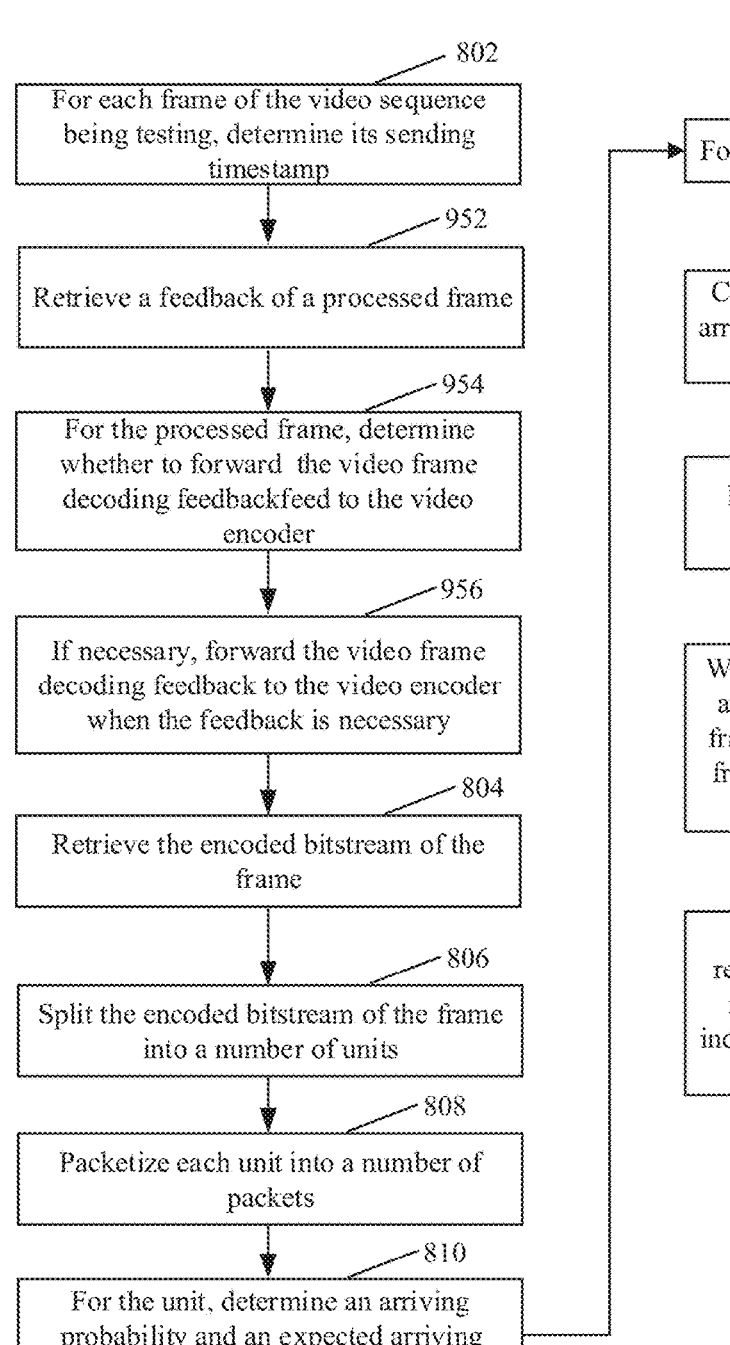
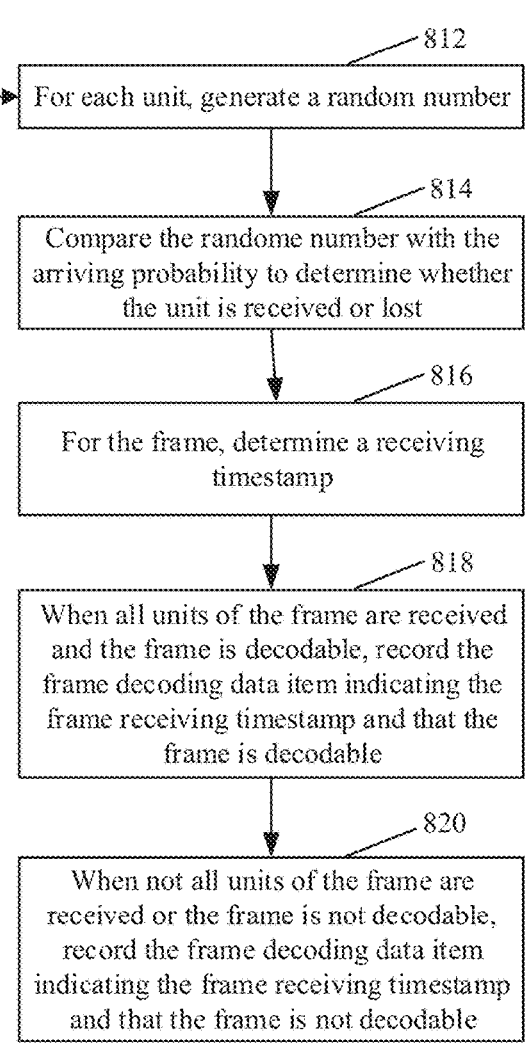
Figure 9

SYSTEM AND METHOD FOR DETERMINING VIDEO CODEC PERFORMANCE IN REAL-TIME COMMUNICATION OVER INTERNET

CROSS REFERENCE TO RELATED APPLICATIONS

This application is a continuation of co-pending U.S. patent application Ser. No. 18/093,788, entitled "SYSTEM AND METHOD FOR DETERMINING VIDEO CODEC PERFORMANCE IN REAL-TIME COMMUNICATION OVER INTERNET", filed Jan. 5, 2023, assigned to Agora Lab, Inc. of Santa Clara, California, which is hereby incorporated by reference in its entirety and claims the priority benefit of U.S. Provisional Pat. App. No. 63/311,205, filed Feb. 17, 2022, entitled "SYSTEM AND METHOD FOR DETERMINING VIDEO CODEC PERFORMANCE IN REAL-TIME COMMUNICATION OVER INTERNET," which is hereby incorporated by reference herein in its entirety.

FIELD OF THE DISCLOSURE

The present invention generally relates to real-time communication (RTC) over a network, and more particularly relates to a system and method for evaluating the quality of experience of RTC use cases over the Internet. More particularly still, the present disclosure relates to a system and method for evaluating the performance of a video codec scheme for RTC use cases over the Internet.

DESCRIPTION OF BACKGROUND

Real-time communication (RTC) over the internet has been used in many areas of our daily life and work. RTC video traffic is usually transmitted over the internet as data packets. Due to reasons such as network congestion and signal strength variation, the transmission network can experience packet loss. The receiver may not decode the corresponding frame when one or more frame packets are lost. Strategies such as Forward Error Correction (FEC) or Packet Retransmission (PR) are utilized to make data transmission more resilient to packet loss, usually at the expense of transmitting more redundant data or incurring additional latency. FEC would insert redundant data through channel coding and take some of the available bandwidth; it would incur little latency. PR would incur a lot more latency by repeatedly sending the lost packets after receiving re-transmitting requests from the receiver.

The existing Common Test Conditions (CTC) lack critical measures to evaluate the quality of experience for RTC use cases. Factors such as video freezing and latency need to be measured. Accordingly, there is a need a method and framework for evaluating the performance of a video codec scheme for RTC use cases and applications. When a codec is tested in this framework, the measured results are reported for the test cases and compared with the results from a baseline video codec.

SUMMARY OF THE DISCLOSURE

Generally speaking, pursuant to the various embodiments, the present disclosure provides a network model and a quality analyzer model that can be used to evaluate the performance of a video codec for real-time communication (RTC) applications. Certain network conditions that simulate some typical real-world network conditions are disclosed. A coded video stream is transmitted from the transmitting end to the receiving end under these conditions, and the end-to-end (E2E) latency and received video fluency are measured along with some existing video quality measures such as Peak Signal-To-Noise Ratio (PSNR), Structural Similarity Index (SSIM), Video Multimethod Assessment Fusion (VMAF). They are used as the performance metrics for measuring the video quality in RTC.

Further in accordance with the present teachings is a video codec performance evaluation system for evaluating the performance of a video codec in real-time communication (RTC) use cases. The video codec performance evaluation system includes a video codec performance evaluation network model adapted to assess a video codec's performance relative to a reference video codec. The video codec includes a video encoder and a video decoder. The video codec performance evaluation system further incudes video codec quality analyzer. The video codec performance evaluation network model is adapted to build a set of f-g lookup tables including packet loss ratio values, network latency values, retransmission values, arriving probability values and expected arriving delay values; determine a set of quantization parameter values; determine a set of seeds for random number generation; and for each value within the set of quantization parameter values and each value within the set of seeds, determine a set of frame decoding data items for a video sequence, thereby forming a list of sets of frames decoding data items, the video sequence including a set of frames. The video codec quality analyzer is adapted to, from each set of frame decoding data items within the list of sets of frame decoding data items, determine a decodable frame ratio, thereby forming a list of decodable frame ratios; determine a delay of decodable frames, thereby forming a list of delays of decodable frames; and determine a video fluency, thereby forming a list of video fluencies. The video codec quality analyzer is further adapted to, from the list of decodable frame ratios, determine a final decodable frame ratio; from the list of delays of decodable frames, determine a final delay of decodable frames; and from the list of video fluencies, determine a final video fluency. The video codec performance evaluation network model determines a set of frame decoding data items by, for each frame within the set of frames, determining a sending timestamp; retrieving an encoded bitstream of the frame from the video encoder; splitting the encoded bitstream into a set of units; and packetizing each unit into a set of packets. In addition, for each unit within the set of units, the video codec performance evaluation network model determines a set of frame decoding data items further by, determining an arriving probability value from the set of f-g lookup tables; determining an expected arriving delay value from the set of f-g lookup tables; generating a random number; and comparing the random number with the arriving probability value to determine the unit is received or lost. The video codec performance evaluation network model determines a set of frame decoding data items further by, for each frame within said set of frames, determining a receiving timestamp; when all units of the frame are received and the frame is decodable, recording a frame decoding data item indicating the frame receiving timestamp and that the frame is decodable; and when not all units of the frame are received or the frame is not decodable, recording a frame decoding data item indicating the frame receiving timestamp and that the frame is not decodable. The video codec performance evaluation network model determines a set of frame decoding data items further by from each set of frame decoding data items within the list of sets of frame decoding data items, determining a maximum delay of decodable frames, thereby forming a list of maximum delays of decodable frames; and, from the list of maximum delays of decodable frames, determining a final maximum delay of decodable frames. The arriving probability values and the expected arriving delay values in the f-g lookup tables are determined using respective formulas below:

$$f(r, s, N) = \text{floor}\left(10000\left(1 - r^{s+1}\right)^N\right)$$

$$g(r, d, s, N) =$$

$$\text{floor}\left(\frac{\left(\sum_{i=1}^{s} (f(r, i, N) - f(r, i-1, N))(2i+1) + f(r, 0, N)\right)d}{f(r, s, N)}\right)$$

wherein r stands for a predetermined packet loss ratio, d stands for a predetermined network latency, s stands for a predetermined number of retransmissions, and N stands for the number of packets within the unit. Each frame decoding data item within the set of frame decoding data items indicates the receiving timestamp and whether the frame is decodable or not. The decodable frame ratio is ratio between the number of frames within the set of frames and the number frames within the set of frames that are decodable. The delay of decodable frames is determined using a formula below:

$$\frac{\sum_{k_i=1}^{N_D} \left(t_r^{k_i} - t_s^{k_i}\right)}{N_D}$$

wherein, $$t_r^{k_i}$$

stands for the receiving timestamp of the frame $k_i$, $$k_i, t_s^{k_i}$$

stands for the sending timestamp of the frame $k_i$ and $N_D$ stands for the number of decodable frames within the set of frames.

The video fluency is determined using a formula below:

$$\frac{\sum_{k=1}^{N_D-1} \left(t_r^{k_i+1} - \left(t_r^{k_i} + \frac{1}{fps}\right)\right)^2 + \left(t_r^{k1} - t_r^1\right)^2 + \left(t_r^{N_E} - t_r^{k_{N_D}}\right)^2}{N_E}$$

wherein fps stands for the number of frames per second and $N_E$ stands for the number of decodable frames within the set of frames.

The receiving timestamp is determined using a formula below:

$$t_r^n = t_s^n + \max_{0 \le m < M} g(r, d, s, N_m)$$

wherein n stands for the index number of the frame within the set of frames.

The video codec performance evaluation network model determines a set of frame decoding data items further by retrieving a video frame decoding feedback of a processed frame; determining whether to forward the video frame decoding feedback to the video encoder that encodes the frame; and forwarding the video frame decoding feedback to the video encoder. The video frame decoding feedback is forwarded to the video encoder when $$t_r^k + d < t_s^n.$$

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 7 is a flowchart illustrating a process by which a video codec performance evaluation system determines performance metrics of a video codec for real-time communication in accordance with this disclosure.

FIG. 8 is a flowchart illustrating a process by which a video codec performance evaluation system determines a set of frames decoding data items for a quantization parameter value and a seed in accordance with this disclosure.

FIG. 9 is a flowchart illustrating a process by which a video codec performance evaluation system determines a set of frames decoding data items for a quantization parameter value and a seed in accordance with this disclosure.

A person of ordinary skill in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well understood elements that are useful and/or necessary in a commercially feasible embodiment may not be depicted in order to provide a clear view of various embodiments in accordance with the present teachings.

DETAILED DESCRIPTION

Figure 1:
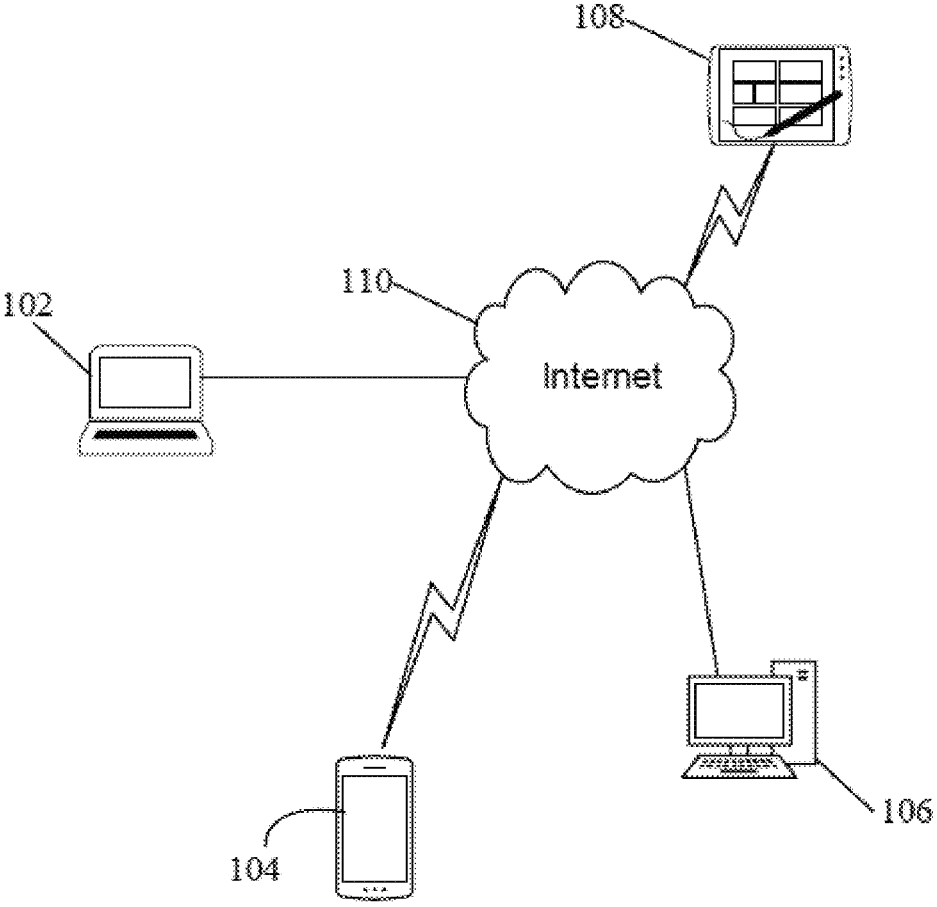
FIG. 1 is a block diagram of a real-time communication system in accordance with this disclosure.

Turning to the Figures and to FIG. 1 in particular, a block diagram illustrating a real-time communication (RTC) system is shown. The real-time video communication system 100 includes a set (meaning one or more) of participating electronic devices, such as those indicated at 102, 104, 106 and 108. The real-time video communication system electronic devices 102-108 communicate with each other over the Internet 110. When one device, such as 102, sends video (or audio) data to the other devices (such as the devices 106 and 108), the device 102 is referred to as a sender and the sending end while the other devices are referred to as receivers and the receiving ends regarding the particular piece of data. They connect to the Internet 110 via local area networks, such as Wi-Fi networks, public cellular phone networks, Ethernet networks, etc. Each of the electronic devices 102-108 is further illustrated by reference to FIG. 2.

Figure 2:
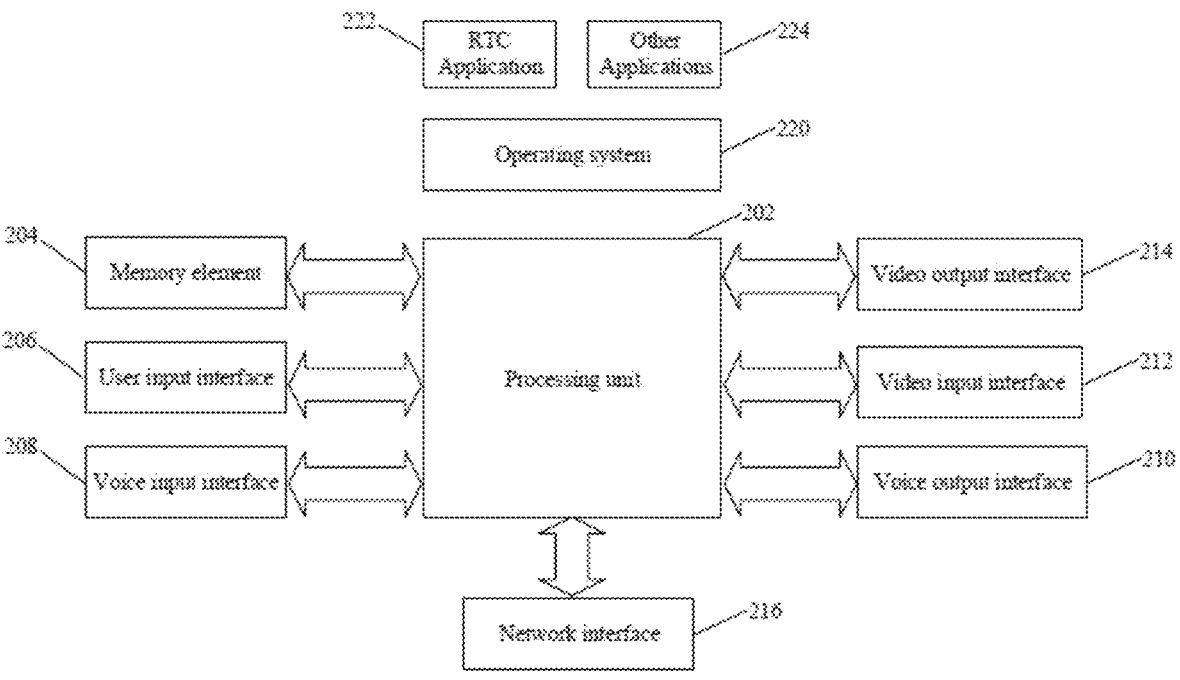
FIG. 2 is a block diagram of a real-time communication device having an improved real-time communication application in accordance with this disclosure.

Referring to FIG. 2, a simplified block diagram of a real-time video communication device, such as the device 102, is shown. The device 102 includes a processing unit (such as a central processing unit (CPU)) 202, some amount of memory 204 operatively coupled to the processing unit 202, one or more input interfaces (such as a mouse interface, a keyboard interface, a touch screen interface, etc.) 206 operatively coupled to the processing unit 202, an audio output interface 210 operatively coupled to the processing unit 202, a network interface 216 operatively coupled to the processing unit 202, a video output interface 214 (such as a display screen) operatively coupled to the processing unit 202, a video input interface 212 (such as a camera) operatively coupled to the processing unit 202, and an audio input interface 208 (such as a microphone) operatively coupled to the processing unit 202. The device 102 also includes an operating system 220 and a specialized real-time video communication software application 222 adapted to be executed by the processing unit 202. The real-time video communication software application 222 is programmed using one or more computer programming languages, such as C, C++, C #, Java, etc. It includes components and modules for RTC communications over the Internet.

Figure 3:
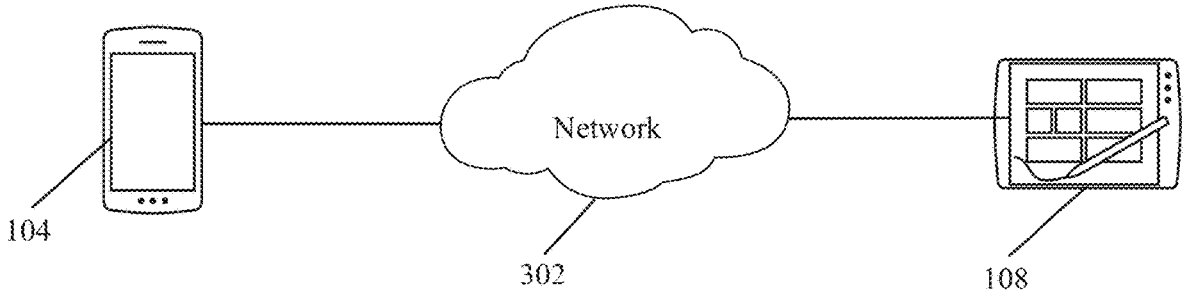
FIG. 3 is a block diagram illustrating a RTC system in accordance with this disclosure.
Figure 4:
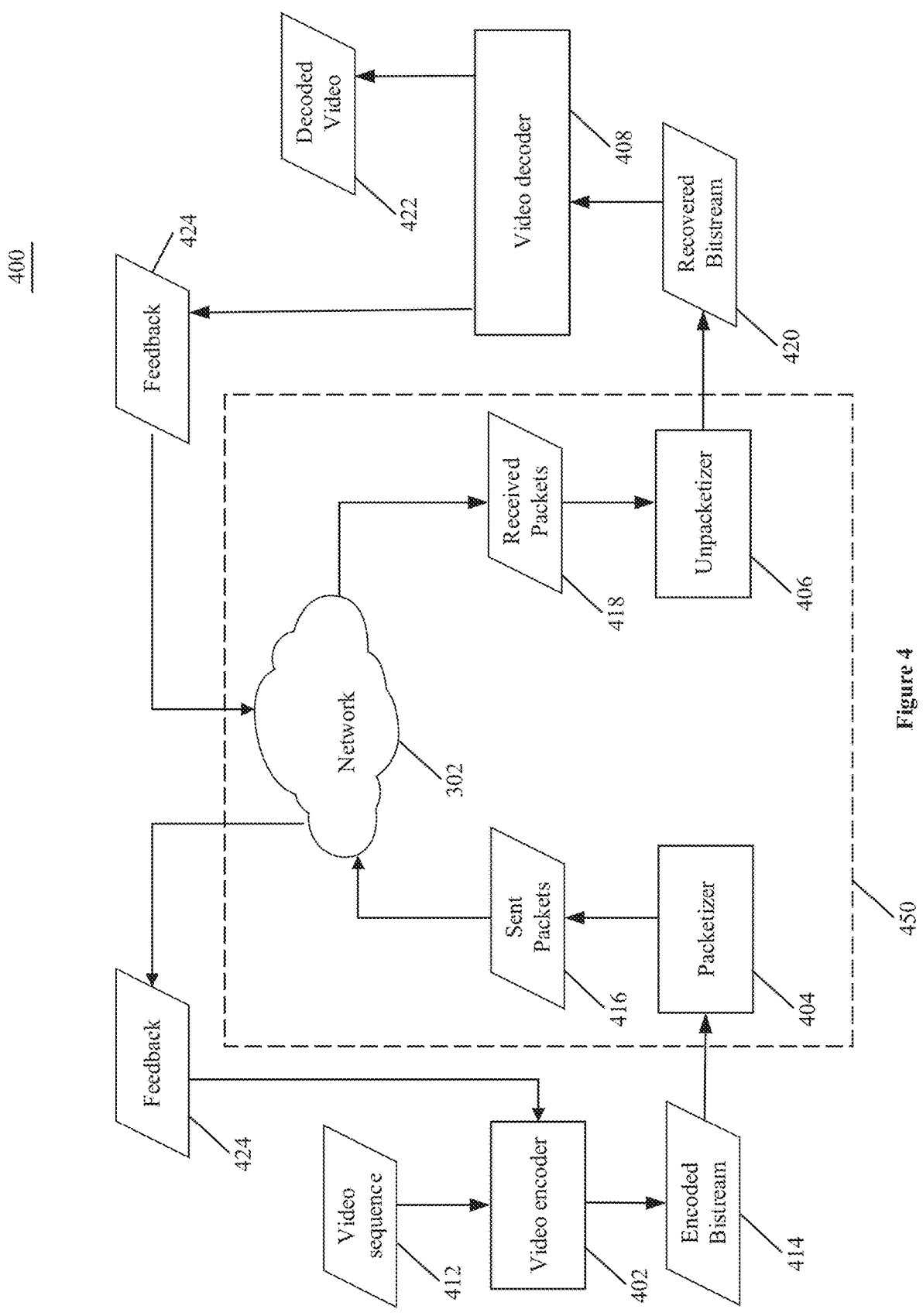
FIG. 4 is a block diagram illustrating a RTC system testing framework in accordance with this disclosure.

In an RTC use case, as shown in FIGS. 3 and 4, the sender 104 runs an encoder and a packetizer while the receiver 108 runs an unpacketizer and a decoder. The RTC system and its data flow for sending a video sequence from the sender 104 to the receiver 108 is shown and generally indicated at 400 in FIG. 4. The sender 104 communicates with the receiver 108 over a network (such as the Internet) 302. It should be noted that, when the receiver 108 sends a piece of data (such as video data) to the sender 104, the sender 104 becomes the receiver while the receiver 108 becomes the sender relative to the piece of data. The encoder 402 encodes a video sequence 412 and sends the coded bitstream 414 to the packetizer 404. The video sequence consists of several pictures or video frames. A frame may be further partitioned into slices or tiles. A video unit for coding may mean a frame, a slice, or a tile.

The packetizer 404 packs the encoded video stream 414 into several data packets 416 and sends these packets (also referred herein as sent packets) 416 to the decoder 408 at the receiving end through the network 302. In a simplified way, the network condition can be described by the packet loss ratio r, the upper bandwidth limit b, and the end-to-end (E2E) network delay or latency d. To make the transmission more resilient to packet loss, schemes such as PR and FEC are used to recover the lost packets during transmission.

At the receiving end on the device 108, the unpacketizer 406 receives packets (i.e., received packets 418) and unpacks them by parsing them according to the related scheme (e.g., FEC). Once the received packets 418 of a video unit are all received and recovered, they are sent to the video decoder 408 as the recovered bitstream 420. The video unit is then decoded and reconstructed by the decoder 408. The decoder 408 outputs the decoded video for playback or other use (such as storing and backing up). The subsystem 450 of the RTC system 400 includes the packetizer 404, the network 302 and the unpacketizer 406.

When the video unit depends on a reference frame, the reference frame has to be decoded successfully for the unit to be decoded successfully. The video unit may not be decodable when it depends on a reference frame and the reference frame is not decoded successfully. The reference frame cannot be decoded successfully because some of its packets have been lost during transmission. To alleviate this problem, some schemes would let the receiver send a feedback message 424, indicating whether a video unit is successfully decoded or not to the transmitting side, to help the encoder 402 select reliable reference frames or encode an Instantaneous Decoder Refresh (IDR) frame.

The encoder 402, the packetizer 404, the unpacketizer 406 and the decoder 408 are software components. They each are a collection of computer programs coded with computer programming languages, such as C, C++, C #, Java, etc.

With the network 302 being a time-variant system, it is nearly impossible to reproduce the identical results of latency and fluency in the real-world network when the encoder 402 is used to code the same video sequence 412 at two different times. Therefore, it is not feasible to evaluate and compare the performance of different video codecs and coding tools in the real-world network. Video coding tools are various technologies (such as inter prediction, intra prediction,). Video codecs (such as H.264, H.265, AV1, and VP9) use video tools to encode and decode video data. As used herein, video codecs and video coding tools are collectively referred to as video codecs. Accordingly, there is a need to find a way to benchmark codec quality in RTC use cases reliably. The present teachings disclose a network model that can be used to reproduce identical results given certain network conditions. As a part of a new video codec performance evaluation system for RTC, the network model can be used to assess how a new coding tool performs relative to an original codec from the viewpoint of RTC quality.

As used herein, r stands for the packet loss ratio, b stands for the network bandwidth limit used to transmit the media video stream over a network, and d denotes the E2E network delay (also referred to as One Way Delay (OWD)).

Given that anti-packet-loss schemes such as PR and FEC will impact the effective values of r, b and d, another parameter s is introduced to represent the effect of these schemes. For simplicity, the case of PR is taken as an illustrative example herein. The parameter s is defined be the maximum number of times a packet can be sent again after it is sent initially. Usually, a packet is sent again because it is regarded as being lost at the receiving end after it was sent previously, and notification (e.g., Negative Acknowledgement (NACK)) is sent to the transmitting side. When the lost packets are transmitted multiple times, the E2E delay of a video unit that contains a lost packet, d, becomes larger; the effective loss ratio of an initially lost packet, r, becomes smaller; and the effective video bitrate b becomes smaller.

s=0 represents the case when no PR is used (i.e., a packet is only sent once). A positive value of s means a reduced effective packet loss ratio. Repeatedly resending a lost packet would ensure that the packet is received at the decoder side (meaning the receiving side) in a network with r<1 eventually. There is usually an upper limit for s in practice, because a large value would incur too much of a delay or waste of network bandwidth. This limit is set to be 4 in one embodiment of the present teachings.

Figure 5:
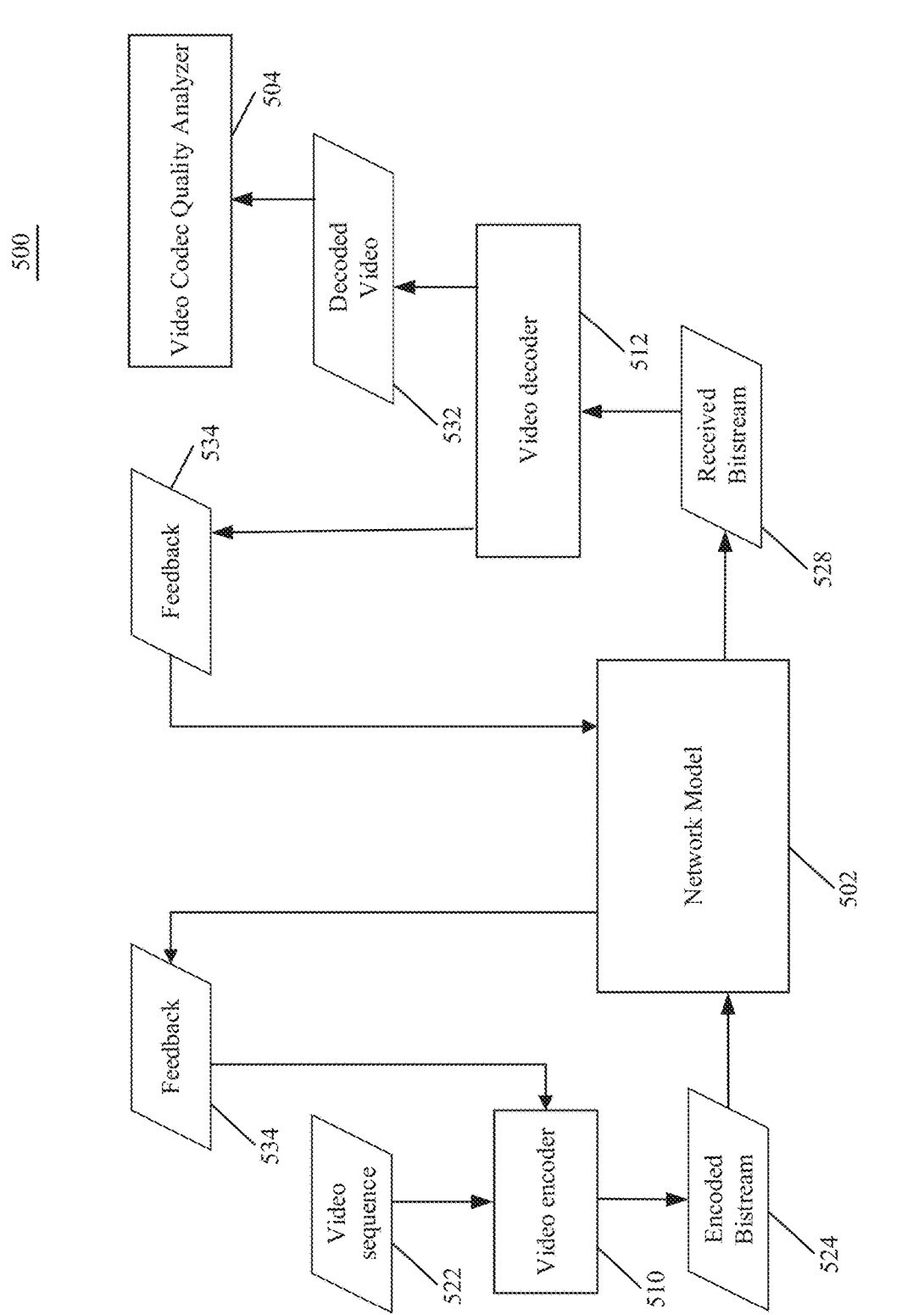
FIG. 5 is a block diagram illustrating a video codec performance evaluation system for RTC in accordance with this disclosure.

The present teachings provide a new system and method for evaluating the performance of a video codec. The new testing system is further illustrated by reference to FIG. 5. Referring to FIG. 5, a block and dataflow diagram illustrating the new system and method for evaluating the performance of a video codec in RTC use cases is shown and generally indicated at 500. In particular, the new video codec performance evaluation system 500 includes a video codec performance evaluation network model 502 and a video codec quality analyzer 504. In one embodiment, both the network model 502 and the video codec quality analyzer 504 each are computer software coded using one or more computer programming languages, such as C, C++, C #, Java, etc.

The video encoder and the video decoder being tested are indicated at 510 and 512 respectively. Input video sequence (also referred to herein at the testing video data and testing video sequence) is indicated at 522. The video sequence 522 includes a set of video frames (or frames for short). The encoder 510 encodes the video sequence 522 into the encoded bitstream 524. The encoded bitstream 524 and its corresponding sending timestamp are input to the network model 502. The video codec performance evaluation network model 502 outputs the received bitstream 528 and its corresponding receiving timestamp, which are the input to the video decoder 512. The video decoder 512 outputs the decoded video 532. In a further implementation, the decoder 512 outputs a feedback 534 and sends it to the encoder 510.

The video codec performance evaluation network model 502 is used to assess how a coding tool (such as a video codec, including a video encoder) performs relative to a reference video codec (such as a baseline video codec) from the viewpoint of RTC quality. When the video codec performance evaluation network model 502 and the video codec quality analyzer 504 are in operation to test the performance of the video encoder 510, they are executed on an electronic device, such as the devices 102-108.

The video codec performance evaluation network 502 considers the four parameters s, r, d and b. The bandwidth parameter b can usually be ignored for the sake of a codec evaluation as the testing video (also referred to herein as testing video sequence, video or video sequence) 522 is usually coded at several different bitrates when the video codec is evaluated. The video codec performance evaluation network model 502 selects the coded video sequence of a particular bitrate (such as 800 kbps, 400 kbps, 200 kbps, and 100 kbps) that matches a target network's bandwidth. To further simplify the testing, a finite set of quantization parameter (QP) values to encode the video test sequences in the constant QP (CQP) mode is adopted by the network model 502. For example, the QP values are between 0 and 51 for video encoding under the H.264 video encoding standard. In one implementation, the network model 502 sets the QP values to 22, 27, 32 and 37 in determining the RTC quality metrics of the video encoder 510. As another example, the QP values are between 0 and 255 for video encoding under the AOMedia Video 1 (AV1) video encoding standard. This would roughly result in a bitstream with a relatively stable bitrate for a testing video sequence that contains similar content.

Significant change of the coded frame sizes would impact the latency and fluency of the received video. A larger coded frame is more likely to be packed into more packets and thus would take a longer time to transmit over the network and have a higher chance of losing a packet in a lossy network. Accordingly, the video encoder in RTC is highly desired to generate the bitstream with a constant bitrate. In order to alleviate the difference between the CQP and CBR (standing for constant bitrate) encoding modes, a codec can be evaluated by the disclosed system and method using a video test sequence in which the content does not change abruptly. For instance, when the testing video sequence 522 is the result of a camera moving steadily while capturing a scene, the consecutive frames of the video change in a smooth manner. On the contrary, when the testing video sequence is a segment of a movie including a scenery change, the change between two consecutive video frames can be dramatic. In one implementation, the size change between two consecutive video frames of the input testing video sequence 522 is less than a predetermined percentage, such as 10% or 25%. In such a case, the testing video sequence is said to have an abruptness less than a predetermined video abruptness threshold.

With the network model 502 factoring in the parameters (r, d, s), a unit of video (such as a slice, a tile, or a frame) 522 is coded and packetized into N (meaning a positive integer) packets by the network model 502. A set of lookup tables, whose index is N and values are f(r, s, N) and g(r, d, s, N) is built by the network model 502. Alternatively, it is prebuilt by a different computer software application and referenced by the network model 502. In such a case, it is said herein that it is built by the network model 502 as well. f(r, s, N) is the arriving probability of the unit of video 522 coded into N (meaning a positive integer) received packets, and also referred to herein as an f value (or f value). g(r, d, N, s) is the expected arriving delay of the unit of video 522, and also referred to herein as a g value (or g value). To avoid the floating precision problem among different platforms (such as an iPhone, an iPad, an Android smartphone, an Android tablet computer, a desktop computer running a Windows operating system, and a laptop computer running a Windows operating system), f(r, s, N) is scaled by 10000 and floored to the nearest integer while g(r, d, s, N) is also floored to the nearest integer. The scaling and flooring are performed by the network model 502. Alternatively, they are built by a different computer software application. In such a case, it is said herein that they are built by the network model 502. The lookup tables (LUT) are also referred to herein as f-g lookup table. When the network model 502 factors the parameters (r, d, s) in evaluating the performance of a video codec, the parameters (r, d, s) represent a network case.

The network model 502 further derives f(r, s, N) and g(r, d, s, N) via the formulas below:

$$f(r, s, N) = \mathrm{floor}\left(10000\left(1 - r^{s+1}\right)^N\right)$$

$$g(r, d, s, N) = \\ \mathrm{floor}\left(\frac{\left(\sum_{i=1}^{s}(f(r, i, N) - f(r, i-1, N))(2i+1) + f(r, 0, N)\right)d}{f(r, s, N)}\right)$$

Note that d does not affect f(r, s, N) and is proportional to g(r, d, s, N).

In the case that the feedback message 534 is not considered for encoding decisions, d can simply be set to a fixed value, such as the OWD. For example, when d=100 ms is set, the network model 502 calculates g(r, 100, s, N) as the formula below:

$$g'(r, s, N) = \text{floor}\left(\frac{100\left(\sum_{i=1}^{s}(f(r, i, N) - f(r, i-1, N))(2i+1) + f(r, 0, N)\right)}{f(r, N, s)}\right)$$

For a different d value, the above expression is then scaled accordingly by the network model 502.

In the case that the feedback message 534 is considered for encoding decisions, the delay d will affect the estimated feedback time to the encoder side (meaning the sending side) 510. In such a case, a different d value needs to be tested to evaluate the performance of the proposed encoder 510.

Accordingly, for a given triplet of parameters (r, d, s), the values of the functions f(r,s, N) and g(r, d, s, N) are calculated for different N values, and the corresponding lookup tables are obtained by the network model 502. For example, for r=0.25, d=300 ms and s=4, the corresponding f(r, s, N)=9980 and g(r, d, s, N)=654 for N=2.

The present teachings define the set of RTC test conditions under which the video codec quality is evaluated. These test conditions are implemented as a set of lookup tables that can be derived as described above. In one implementation, the network model 502 builds the lookup tables. Alternatively, the lookup tables are built by a different computer software application or retrieved from a different source. In such case, it is said herein that the network model 502 builds or derives the lookup tables.

During the process of evaluating the performance of the video encoder 510 and video decoder 512, a video frame may be encoded as one or more self-decodable units. A self-decodable unit may be a slice, a tile or even a frame of the testing video sequence input. Each coded unit is packetized as N packets by the video codec performance evaluation network model 502. For the network condition (r, d, s), the corresponding values of f(r, s, N) and g(r, d, s, N) are found in the lookup tables by the network model 502. For each unit of video, a pseudo uniform random integer number p in the range of 0 to 10000 is first generated by the network model 502. Alternatively, the network model 502 causes it generated. In such a case, it is also said that the network model 502 generated the pseudo uniform random integer number p. The network model 502 then compares it with f(r, s, N). If p≤f(r, s, N), all packets of this video unit are regarded as received at the decoder. The network model 502 then outputs the packets as the received bitstream 528 to the video decoder 512. If p>f(r, s, N), one or more packets of the video unit are regarded as having been lost during transmission. The network model 502 then does not provide the packets of the video unit to the video decoder 512 as the received bitstream 528. In one implementation, when any packet is lost or otherwise not received, the corresponding unit of the packet is deemed lost.

In order to get identical results in repeated experiments of the same test, the random number generator needs to use a fixed seed. To approximate the distribution of f(r, s, N), the experiments are conducted a few times by the network model 502, each with a different seed. The network model 502 then averages the results as the final result. In order to control the overall testing time, the network model 502 selects a finite set of seeds, such as three seeds (0, 1, 2), during the experiments for evaluating the performance of the video encoder 510.

After the network model 502 determines that all units of a video frame have been received, the video decoder 512 checks whether its reference frames are also received. When a reference frame is deemed lost, at least one of its packets must have been lost. If any of its reference frame is lost, the video frame is marked as non-decodable by video decoder 512. Otherwise, the current video frame is marked as decodable, and its frame number and receiving timestamp are stored or otherwise tracked. The timestamp is the latest receiving timestamp of all packets that belong to the current video frame. After a test case is finished, all the data collected at the encoder and decoder sides are then used to calculate the RTC quality metrics for evaluating the performance of the video codec.

The process by which the video codec performance evaluation system determines the RTC quality metrics of a video codec is further illustrated to references to the flowcharts shown in FIGS. 7, 8 and 9. Turning first to FIG. 7, a flowchart illustrating the process by which the video codec performance evaluation system determines the RTC quality metrics of a video codec is shown and generally indicated at 700. The process is formed for a network described by the three parameters with r, d and s. The video input to the process 700 is the video sequence 522. At 702, the network model builds a set of f-g lookup tables (such as the Tables 1 and 2 shown below) based on the r, d and s. At 704, the network model determines a finite set of quantization parameter values. At 706, the network model determines a finite set of seeds for random number generation. At 708, for each value within the set of quantization parameter values and each value within the set of seeds, the network model 502 determine a set of frame decoding data items to form a list of sets of frame decoding data items. For example, when there are 4 values in the set of quantization parameter values and 3 values in the set of seeds, the list above then includes 12 sets of frames decoding data items. In one implementation, an illustrative frame decoding data item is a triplet $$(n, t_r^n, 1).$$

n stands for the index of the frame within a video sequence;

$$t_r^n$$

stands for the receiving timestamp of the frame n; and 1 indicates that the frame has been received and is decodable. As another example, $$(n, t_r^n, 0)$$

indicates that the frame n is not decodable.

From each set of frame decoding data items within the list of sets of frame decoding data items, at 710, the video codec quality analyzer 504 determines a decodable frame ratio. Accordingly, a list of decodable frame ratios is generated at 710. In one implementation, the decodable frame ratio is determined using the formula below:

$$\frac{N_D}{N_E}$$

$N_E$ denotes the number of video frames that the encoder 510 encodes from the video sequence 522 while $N_D$ denotes the number of video frames that the decoder 512 successfully decodes from received frame of the video sequence 522.

From each set of frame decoding data items within the list of sets of frame decoding data items, at 712, the video codec quality analyzer 504 determines a delay of decodable frames. Accordingly, a list of delays of decodable frames is generated at 712. From each set of frame decoding data items within the list of sets of frame decoding data items, at 714, the video codec quality analyzer 504 determines a maximum delay of decodable frames. Accordingly, a list of maximum delays of decodable frames is generated at 714. In one implementation, the delay of decodable frames and the maximum delay of decodable frames are determined using the respective formulas below:

$$\frac{\sum_{i=1}^{N_D}\left(t_r^{k_i}-t_s^{k_i}\right)}{N_D}$$

$$\max_{1\leq i\leq N_D}\left(t_r^{k_i}-t_s^{k_i}\right)$$

The set of the decodable frame index are $\{k_i|0\leq k_i\leq N_E-1\}$, where $i=1,2,\ldots,N_D$.

From each set of frame decoding data items within the list of sets of frame decoding data items, at 716, the video codec quality analyzer 504 determines a video fluency. Accordingly, a list of video fluencies is generated at 716. In one implementation, the video fluency is determined using the formula below:

$$\frac{\sum_{i=1}^{N_D-1}\left(t_r^{k_{i+1}}-\left(t_r^{k_i}+\frac{1}{fps}\right)\right)^2+\left(t_r^{k_1}-t_r^1\right)^2+\left(t_r^{N_E}-t_r^{k_{N_D}}\right)^2}{N_E}$$

Here, $$t_r^{k_i}+\frac{1}{fps}$$

represents the expected reception time (also referred to herein as the expected arrival time) of the frame $k_i+1$. The difference between $$t_r^{k_{i+1}}\text{ and }t_r^{k_i}+\frac{1}{fps}$$

is the gap between the actual received reception timestamp $$t_r^{k_{i+1}}$$

and the expected reception timestamp of frame $k_i+1$. Ideally, the difference between $$t_r^{k_{i+1}}\text{ and }t_r^{k_i}+\frac{1}{fps}$$

is 0. However, due to the loss of frames or network delay, it can be non-zero. Noted that there exists a probability that $$t_r^{k_{i+1}}-\left(t_r^{k_i}+\frac{1}{fps}\right)<0,$$

which means the receiver receives frame $k_{i+1}$ when frame $k_i$'s ideal time span is not over. This is also considered as the disfluency since it displays the frame faster than expected. The last two terms $$\left(t_r^{k_1}-t_r^1\right)^2\text{ and }\left(t_r^{N_E}-t_r^{k_{N_D}}\right)^2$$

are used in case the first or the last frame of the video is lost. From the list of decodable frame ratios, at 718, the video codec quality analyzer 504 determine a final decodable frame ratio. In one implementation, the final decodable frame ratio is an average of the decodable frame ratios within the list of decodable frame ratios. From the list of delays of decodable frames, at 720, the video codec quality analyzer 504 determine a final delay of decodable frames. In one implementation, the final delay of decodable frames is an average of the delays of decodable frames within the list of delays of decodable frames. From the list of maximum delays of decodable frames, at 722, the video codec quality analyzer 504 determine a final maximum delay of decodable frames. In one implementation, the final maximum delay of decodable frames is the average of the maximum delays of decodable frames within the list of maximum delays of decodable frames. From the list of video fluencies, at 724, the video codec quality analyzer 504 determine a final video fluency. In one implementation, the final video fluency is an average of the video fluencies within the list of video fluencies. The real-time communication quality metrics of the video codec include the final decodable frame ratio, the final delay of decodable frames, the final maximum delay of decodable frames, and final video fluency.

n stands of the current frame number within the video sequence. It is a positive integer starting from 0. Fps stands for the number for frames per second in the video sequence being tested.

$$t_r^n$$

stands for the reception timestamp (or time) of frame n while $$t_s^n$$

stands for sending timestamp of frame n. As used herein, for any particular frame, the difference between its reception timestamp and successfully decoded timestamp is trivial and regard as zero for effective performance evaluation of the video codec. Therefore, its reception timestamp and successfully decoded timestamp are regarded as the same. Similarly, as used herein, for any particular video frame, the difference between its sending timestamp and successfully encoded timestamp is trivial and regard as zero for effective performance evaluation of the video codec. Therefore, its sending timestamp and successfully encoded timestamp are regarded as the same.

The determination of the set of frame decoding data items at 708 is further illustrated by reference to FIG. 8. Referring to FIG. 8, a flowchart illustrating a process by which the video codec performance evaluation system determines the set of frames decoding data items for the particular quantization parameter (QP) value within the set of QP values and a particular seed within the set of seeds, is shown and generally indicated at 800. At 802, for each frame of the video sequence 522, the network model 502 determines a sending timestamp. In one implementation, the network model 502 retrieves the sending timestamp $$t_s^n$$

from the video sequence 522; and $$t_s^n = \frac{n}{fps}$$

where fps is the number of frames per second within the video sequence 522. At 804, the network model 502 retrieves or otherwise receives the encoded bitstream of the frame. The video encoder 510 encodes the frame into the encoded bitstream. At 806, the network model 502 splits the encoded bitstream of the frame into a number (M) of units. At 808, the network model 502 packetizes each unit m of the M units into a number ($N_m$) of packets.

At 810, for the unit m, the network model 502 determines an arriving probability value f(r, s, $N_m$) and an expected arriving delay value g(r, d, s, $N_m$) from the set of f-g lookup tables. At 812, for each unit, the network model 502 generates a random number p. In one implementation, the random number p is the pseudo uniform random integer number p in the range of 0 to 10000 set forth above. At 814, the network model 502 compares the random number p against the arriving probability f(r, s, $N_m$) to determine whether the unit m is received or lost. In one implementation, if p≤f(r, s, N), all packets of the video unit m and the unit are regarded as received at the decoder. Otherwise, (p>f(r, s, N)), one or more packets of the video unit are regarded as having been lost during transmission. The unit m also regarded as lost. At 816, the network model 502 determines the receiving timestamp of the frame. In one implementation, the frame's receiving timestamp is determined using the formula below:

$$t_r^n = t_s^n + \max_{0 \le m < M} g(r, d, s, N_m)$$

At 818, when all units of the frame are received and the frame is decodable, the network model 502 records the frame decoding data item indicating the frame receiving timestamp and that the frame is decodable. The video decoder 512 determines whether the frame is decodable. In one implementation, the frame decoding data item is a triplet $$(n, t_r^n, 1).$$

14

In a further implementation, the video decoder 512 determines additional video quality measures, such as Peak Signal-To-Noise Ratio (PSNR), Structural Similarity Index (SSIM), and Video Multimethod Assessment Fusion (VMAF). PSNR can be calculated as $$10 \log_{10} \frac{\left(2^{BitDepth} - 1\right)^2}{MSE}$$

and SSIM can be calculated as $$\frac{(2\mu_x\mu_y + c_1)(2\sigma_{xy} + c_2)}{\left(\mu_x^2 + \mu_y^2 + c_1\right)\left(\sigma_x^2 + \sigma_y^2 + c_2\right)}$$

At 818, the network model 502 records frame decoding data items including the video quality measures PSNR, SSIM and VMAF. For example, frame decoding data items $$(n, t_r^n, 1, PSNR, SSIM, VMAF)$$

are recorded at 818. These frame decoding data items are used for determining the performance metrics of the video codec.

At 820, when not all units of the frame are received or the frame is not decodable, the network model 502 records the frame decoding data item indicating the frame receiving timestamp and that the frame is not decodable. In one implementation, the frame decoding data item is a triplet $$(n, t_r^n, 0).$$

When the decoding side provides feedback regarding the status of received video frames to the encoding side, the network model 502 forwards the feedback to the video encoder 510. In such a case, the determination of the set of frame decoding data items at 708 is illustrated by the flowchart shown in FIG. 9 with the process generally indicated at 900. For a particular frame k, at 952, the network model 502 retrieves or otherwise receives a feedback. The video frame decoding feedback retrieved at 952 indicates its receiving timestamp $$t_r^k$$

and whether it is decodable or not. At 954, the network model 502 determines whether to forward the video frame decoding feedback to the video encoder 510. In one implementation, $$\text{if } t_r^k + d < t_s^n,$$

the video frame decoding feedback should be forwarded to the video encoder 510. Otherwise, not. At 956, if the forwarding is necessary determined at 954, the network model 502 forwards the feedback to the video encoder 510.

It should be noted that the decoding process is performed on each unit of a frame. A frame of video includes one or more units. The presently decoded unit is also referred to herein as the current unit. Once a unit is decodable, it can be further used for encoding of subsequent frames.

When the network model 502 evaluates the performance of the video codec, it determines RTC quality metrics of video transmission. When the testing cases are performed, the maximum number of retransmissions is set to a finite number, such as 4 (s=4). To effectively evaluate the performance of the video encoder 510, the network model 502 sets the packet loss rate to predetermined values, such as 0%, 25%, and 50%, which can represent typical network conditions. Furthermore, the network model 502 sets the E2E delay to predetermined values, such as 50 ms and 300 ms, to represent the E2E latency of network transmission, for example, within a country and across an ocean. The specific numerical values referenced in this paragraph are for illustrative purposes. In different implementations, they may vary.

When the video encoder 510 does not factor in the feedback 534, d actually does not directly influence the end results. Moreover, when r=0%, the evaluation method of the present teachings is then identical to traditional CTC cases. Accordingly, for the no-feedback case, there are a total of six test cases with the packet loss rate being 25% and 50% and three different seeds respectively. When the video encoder 510 factors in the feedback 534, all the combinations are tested by the network model 502. In such a case, six (6) test cases are performed. With three (3) different seeds selected for the evaluation of the performance of the video codec, there are 6*3=18 test cases to be performed by the network model 502.

For the test cases where the feedback 534 is not considered by the video encoder 510, no confirmation message of whether the decoder 512 successfully decodes all video frames is sent to the video encoder 510. Alternatively, it is sent, but not factored in. For no feedback testing cases, the video encoder 510 periodically sends a self-decodable frame (i.e., an IDR frame) to the video decoder 512. The network model 502 sets the gap between two IDR frames as, for example, two (2) seconds.

Figure 6:
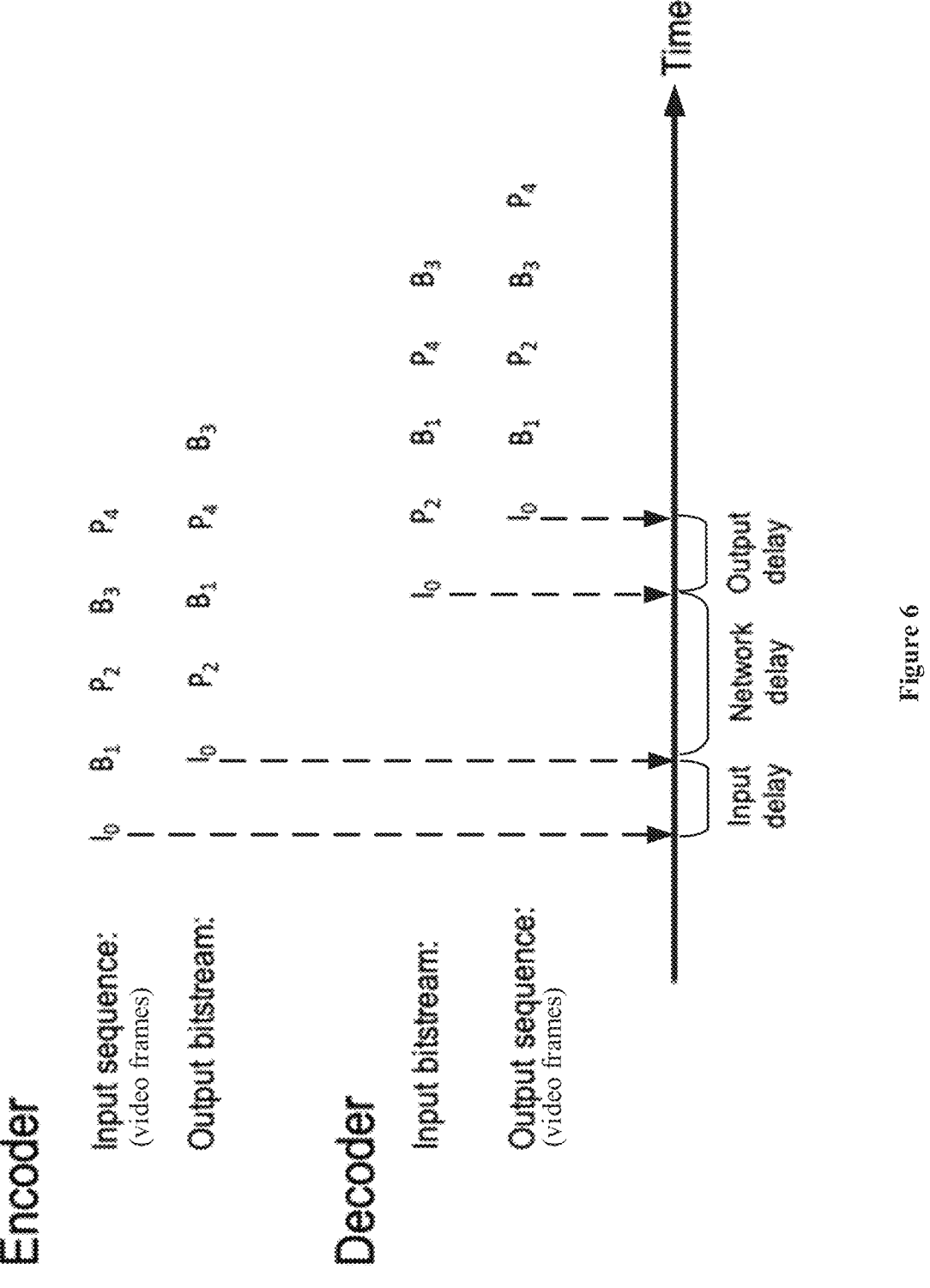
FIG. 6 is a diagram illustrating an additional delay introduced by backward reference in accordance with this disclosure.

For each feedback test case, when the video decoder 512 successfully decodes a video frame, the decoder 512 sends a confirmation message 534 to the video encoder 510 indicating that the decoder 512 has successfully decoded the frame. In such a case, the encoder 512 has more flexibility to choose the encoded frame type. It can send an IDR frame or a frame with its reference frame already successfully decoded as a reference frame when one or more frames are lost during the transmission. However, since more reference frames introduce more data dependency, which is not desirable for lossy network transmission. To limit such additional data dependency, only one (1) reference is used in one embodiment of the present teachings. Moreover, for no feedback mode, a nearest reference frame is used for the best compression performance in one implementation. The low-delay encoding mode of the present teachings is more desirable since low delay is critically important in RTC. It should be noted that, in the backward-reference case, more delay introduced as further illustrated in FIG. 6. When only one backward reference-frame is used, there will be two frames' delay for the overall real-time communication system. More delay will be introduced if more backward reference frames are used. Accordingly, in RTC cases, it is not recommended to use the backward-reference frame type.

The determination of RTC quality measures is further illustrated below. The video codec quality analyzer 504 checks which frames are received and decoded fully at the decoder side based on the reference relationships is checked. The video codec quality analyzer 504 further calculates the overall delay, the ratio of decodable video frames and the video freeze time are thus calculated. The video freeze time measures the fluency of the received video.

The f-g lookup tables can be generated by, for example, a Python script and referenced by the network model 502. As said herein, the f-g LUTs are said to be created by the network model 502. Illustrative results, with the maximum number of retransmissions set to four (s=4), for six test cases having six different combinations of two network delay values (d=50 ms or d=300 ms) and three packet loss ratio values (r=50.0%, r=25.0%, or r=0.0%), for video units ranging in size from N=1 to N=256 data packets, are shown in Tables 1 and 2 below. For the Tables 1-2 below, the retransmission parameter s has a value of 4. Though the s parameter is not shown in the Tables 1-2, the Tables 1-2 inherently incorporates the parameter s. Accordingly, the Tables 1-2 are said to include the s parameter

TABLE 1

| d = 300 ms | | | | | | | | |
|---|---|---|---|---|---|---|---|---|
| d = 300, r = 50.0% | | | d = 300, r = 25.0% | | | d = 300, r = 0.0% | | |
| N | f | g | N | f | g | N | f | g |
| 1 | 9687 | 803 | 1 | 9990 | 497 | 1 | 10000 | 300 |
| 2 | 9384 | 1129 | 2 | 9980 | 654 | 2 | 10000 | 300 |
| 3 | 9091 | 1353 | 3 | 9970 | 781 | 3 | 10000 | 300 |
| 4 | 8807 | 1516 | 4 | 9960 | 885 | 4 | 10000 | 300 |
| 5 | 8532 | 1641 | 5 | 9951 | 971 | 5 | 10000 | 300 |
| 6 | 8265 | 1740 | 6 | 9941 | 1044 | 6 | 10000 | 300 |
| 7 | 8007 | 1823 | 7 | 9931 | 1105 | 7 | 10000 | 300 |
| 8 | 7756 | 1892 | 8 | 9922 | 1159 | 8 | 10000 | 300 |
| 9 | 7514 | 1951 | 9 | 9912 | 1206 | 9 | 10000 | 300 |
| 10 | 7279 | 2003 | 10 | 9902 | 1247 | 10 | 10000 | 300 |
| 11 | 7052 | 2049 | 11 | 9893 | 1285 | 11 | 10000 | 300 |
| 12 | 6831 | 2090 | 12 | 9883 | 1319 | 12 | 10000 | 300 |
| 13 | 6618 | 2126 | 13 | 9873 | 1350 | 13 | 10000 | 300 |
| 14 | 6411 | 2159 | 14 | 9864 | 1379 | 14 | 10000 | 300 |
| 15 | 6211 | 2189 | 15 | 9854 | 1405 | 15 | 10000 | 300 |
| 16 | 6017 | 2217 | 16 | 9844 | 1430 | 16 | 10000 | 300 |
| 17 | 5829 | 2242 | 17 | 9835 | 1454 | 17 | 10000 | 300 |
| 18 | 5646 | 2265 | 18 | 9825 | 1476 | 18 | 10000 | 300 |
| 19 | 5470 | 2287 | 19 | 9816 | 1497 | 19 | 10000 | 300 |
| 20 | 5299 | 2306 | 20 | 9806 | 1517 | 20 | 10000 | 300 |
| 21 | 5133 | 2325 | 21 | 9796 | 1536 | 21 | 10000 | 300 |
| 22 | 4973 | 2342 | 22 | 9787 | 1554 | 22 | 10000 | 300 |
| 23 | 4818 | 2358 | 23 | 9777 | 1572 | 23 | 10000 | 300 |
| 24 | 4667 | 2373 | 24 | 9768 | 1588 | 24 | 10000 | 300 |
| 25 | 4521 | 2387 | 25 | 9758 | 1604 | 25 | 10000 | 300 |
| 26 | 4380 | 2401 | 26 | 9749 | 1620 | 26 | 10000 | 300 |
| 27 | 4243 | 2413 | 27 | 9739 | 1634 | 27 | 10000 | 300 |
| 28 | 4110 | 2425 | 28 | 9730 | 1649 | 28 | 10000 | 300 |
| 29 | 3982 | 2436 | 29 | 9720 | 1662 | 29 | 10000 | 300 |
| 30 | 3857 | 2447 | 30 | 9711 | 1676 | 30 | 10000 | 300 |
| 31 | 3737 | 2457 | 31 | 9701 | 1688 | 31 | 10000 | 300 |
| 32 | 3620 | 2466 | 32 | 9692 | 1701 | 32 | 10000 | 300 |
| 33 | 3507 | 2476 | 33 | 9682 | 1713 | 33 | 10000 | 300 |
| 34 | 3397 | 2484 | 34 | 9673 | 1724 | 34 | 10000 | 300 |
| 35 | 3291 | 2492 | 35 | 9663 | 1736 | 35 | 10000 | 300 |
| 36 | 3188 | 2500 | 36 | 9654 | 1746 | 36 | 10000 | 300 |
| 37 | 3089 | 2507 | 37 | 9644 | 1757 | 37 | 10000 | 300 |
| 38 | 2992 | 2515 | 38 | 9635 | 1767 | 38 | 10000 | 300 |
| 39 | 2899 | 2521 | 39 | 9626 | 1777 | 39 | 10000 | 300 |
| 40 | 2808 | 2528 | 40 | 9616 | 1787 | 40 | 10000 | 300 |
| 41 | 2720 | 2534 | 41 | 9607 | 1796 | 41 | 10000 | 300 |
| 42 | 2635 | 2540 | 42 | 9597 | 1805 | 42 | 10000 | 300 |
| 43 | 2553 | 2546 | 43 | 9588 | 1814 | 43 | 10000 | 300 |
| 44 | 2473 | 2551 | 44 | 9579 | 1822 | 44 | 10000 | 300 |
| 45 | 2396 | 2557 | 45 | 9569 | 1831 | 45 | 10000 | 300 |

TABLE 1-continued d = 300 ms

| d = 300, r = 50.0% | | | d = 300, r = 25.0% | | | d = 300, r = 0.0% | | |
|---|---|---|---|---|---|---|---|---|
| N | f | g | N | f | g | N | f | g |
| 46 | 2321 | 2561 | 46 | 9560 | 1839 | 46 | 10000 | 300 |
| 47 | 2248 | 2566 | 47 | 9551 | 1847 | 47 | 10000 | 300 |
| 48 | 2178 | 2571 | 48 | 9541 | 1855 | 48 | 10000 | 300 |
| 49 | 2110 | 2575 | 49 | 9532 | 1862 | 49 | 10000 | 300 |
| 50 | 2044 | 2580 | 50 | 9523 | 1870 | 50 | 10000 | 300 |
| 51 | 1980 | 2584 | 51 | 9513 | 1877 | 51 | 10000 | 300 |
| 52 | 1918 | 2588 | 52 | 9504 | 1884 | 52 | 10000 | 300 |
| 53 | 1858 | 2592 | 53 | 9495 | 1891 | 53 | 10000 | 300 |
| 54 | 1800 | 2595 | 54 | 9486 | 1898 | 54 | 10000 | 300 |
| 55 | 1744 | 2599 | 55 | 9476 | 1905 | 55 | 10000 | 300 |
| 56 | 1689 | 2602 | 56 | 9467 | 1911 | 56 | 10000 | 300 |
| 57 | 1637 | 2606 | 57 | 9458 | 1917 | 57 | 10000 | 300 |
| 58 | 1585 | 2609 | 58 | 9449 | 1924 | 58 | 10000 | 300 |
| 59 | 1536 | 2612 | 59 | 9439 | 1930 | 59 | 10000 | 300 |
| 60 | 1488 | 2614 | 60 | 9430 | 1936 | 60 | 10000 | 300 |
| 61 | 1441 | 2617 | 61 | 9421 | 1942 | 61 | 10000 | 300 |
| 62 | 1396 | 2620 | 62 | 9412 | 1948 | 62 | 10000 | 300 |
| 63 | 1353 | 2623 | 63 | 9403 | 1953 | 63 | 10000 | 300 |
| 64 | 1310 | 2626 | 64 | 9393 | 1959 | 64 | 10000 | 300 |
| 65 | 1269 | 2628 | 65 | 9384 | 1965 | 65 | 10000 | 300 |
| 66 | 1230 | 2630 | 66 | 9375 | 1970 | 66 | 10000 | 300 |
| 67 | 1191 | 2632 | 67 | 9366 | 1975 | 67 | 10000 | 300 |
| 68 | 1154 | 2635 | 68 | 9357 | 1980 | 68 | 10000 | 300 |
| 69 | 1118 | 2637 | 69 | 9348 | 1986 | 69 | 10000 | 300 |
| 70 | 1083 | 2639 | 70 | 9338 | 1991 | 70 | 10000 | 300 |
| 71 | 1049 | 2641 | 71 | 9329 | 1996 | 71 | 10000 | 300 |
| 72 | 1016 | 2643 | 72 | 9320 | 2001 | 72 | 10000 | 300 |
| 73 | 985 | 2645 | 73 | 9311 | 2005 | 73 | 10000 | 300 |
| 74 | 954 | 2647 | 74 | 9302 | 2010 | 74 | 10000 | 300 |
| 75 | 924 | 2648 | 75 | 9293 | 2015 | 75 | 10000 | 300 |
| 76 | 895 | 2650 | 76 | 9284 | 2019 | 76 | 10000 | 300 |
| 77 | 867 | 2652 | 77 | 9275 | 2024 | 77 | 10000 | 300 |
| 78 | 840 | 2653 | 78 | 9266 | 2029 | 78 | 10000 | 300 |
| 79 | 814 | 2655 | 79 | 9257 | 2033 | 79 | 10000 | 300 |
| 80 | 788 | 2656 | 80 | 9248 | 2037 | 80 | 10000 | 300 |
| 81 | 764 | 2658 | 81 | 9239 | 2042 | 81 | 10000 | 300 |
| 82 | 740 | 2659 | 82 | 9230 | 2046 | 82 | 10000 | 300 |
| 83 | 717 | 2660 | 83 | 9221 | 2050 | 83 | 10000 | 300 |
| 84 | 694 | 2661 | 84 | 9212 | 2054 | 84 | 10000 | 300 |
| 85 | 672 | 2663 | 85 | 9203 | 2058 | 85 | 10000 | 300 |
| 86 | 651 | 2664 | 86 | 9194 | 2063 | 86 | 10000 | 300 |
| 87 | 631 | 2665 | 87 | 9185 | 2067 | 87 | 10000 | 300 |
| 88 | 611 | 2666 | 88 | 9176 | 2070 | 88 | 10000 | 300 |
| 89 | 592 | 2667 | 89 | 9167 | 2074 | 89 | 10000 | 300 |
| 90 | 574 | 2668 | 90 | 9158 | 2078 | 90 | 10000 | 300 |
| 91 | 556 | 2669 | 91 | 9149 | 2082 | 91 | 10000 | 300 |
| 92 | 538 | 2671 | 92 | 9140 | 2086 | 92 | 10000 | 300 |
| 93 | 522 | 2672 | 93 | 9131 | 2090 | 93 | 10000 | 300 |
| 94 | 505 | 2672 | 94 | 9122 | 2093 | 94 | 10000 | 300 |
| 95 | 489 | 2674 | 95 | 9113 | 2097 | 95 | 10000 | 300 |
| 96 | 474 | 2674 | 96 | 9104 | 2100 | 96 | 10000 | 300 |
| 97 | 459 | 2675 | 97 | 9095 | 2104 | 97 | 10000 | 300 |
| 98 | 445 | 2677 | 98 | 9086 | 2107 | 98 | 10000 | 300 |
| 99 | 431 | 2677 | 99 | 9078 | 2111 | 99 | 10000 | 300 |
| 100 | 417 | 2678 | 100 | 9069 | 2114 | 100 | 10000 | 300 |
| 101 | 404 | 2679 | 101 | 9060 | 2118 | 101 | 10000 | 300 |
| 102 | 392 | 2680 | 102 | 9051 | 2121 | 102 | 10000 | 300 |
| 103 | 380 | 2681 | 103 | 9042 | 2124 | 103 | 10000 | 300 |
| 104 | 368 | 2680 | 104 | 9033 | 2127 | 104 | 10000 | 300 |
| 105 | 356 | 2681 | 105 | 9024 | 2131 | 105 | 10000 | 300 |
| 106 | 345 | 2682 | 106 | 9016 | 2134 | 106 | 10000 | 300 |
| 107 | 334 | 2682 | 107 | 9007 | 2137 | 107 | 10000 | 300 |
| 108 | 324 | 2683 | 108 | 8998 | 2140 | 108 | 10000 | 300 |
| 109 | 314 | 2684 | 109 | 8989 | 2143 | 109 | 10000 | 300 |
| 110 | 304 | 2684 | 110 | 8980 | 2146 | 110 | 10000 | 300 |
| 111 | 294 | 2685 | 111 | 8972 | 2150 | 111 | 10000 | 300 |
| 112 | 285 | 2685 | 112 | 8963 | 2153 | 112 | 10000 | 300 |
| 113 | 276 | 2686 | 113 | 8954 | 2156 | 113 | 10000 | 300 |
| 114 | 268 | 2686 | 114 | 8945 | 2158 | 114 | 10000 | 300 |
| 115 | 259 | 2688 | 115 | 8937 | 2161 | 115 | 10000 | 300 |
| 116 | 251 | 2688 | 116 | 8928 | 2164 | 116 | 10000 | 300 |
| 117 | 243 | 2687 | 117 | 8919 | 2167 | 117 | 10000 | 300 |
| 118 | 236 | 2689 | 118 | 8911 | 2170 | 118 | 10000 | 300 |
| 119 | 228 | 2689 | 119 | 8902 | 2173 | 119 | 10000 | 300 |
| 120 | 221 | 2689 | 120 | 8893 | 2175 | 120 | 10000 | 300 |
| 121 | 214 | 2688 | 121 | 8884 | 2178 | 121 | 10000 | 300 |
| 122 | 207 | 2691 | 122 | 8876 | 2181 | 122 | 10000 | 300 |
| 123 | 201 | 2691 | 123 | 8867 | 2184 | 123 | 10000 | 300 |
| 124 | 195 | 2690 | 124 | 8858 | 2186 | 124 | 10000 | 300 |
| 125 | 189 | 2690 | 125 | 8850 | 2189 | 125 | 10000 | 300 |
| 126 | 183 | 2693 | 126 | 8841 | 2192 | 126 | 10000 | 300 |
| 127 | 177 | 2693 | 127 | 8833 | 2194 | 127 | 10000 | 300 |
| 128 | 171 | 2692 | 128 | 8824 | 2197 | 128 | 10000 | 300 |
| 129 | 166 | 2692 | 129 | 8815 | 2199 | 129 | 10000 | 300 |
| 130 | 161 | 2692 | 130 | 8807 | 2202 | 130 | 10000 | 300 |
| 131 | 156 | 2692 | 131 | 8798 | 2204 | 131 | 10000 | 300 |
| 132 | 151 | 2696 | 132 | 8790 | 2207 | 132 | 10000 | 300 |
| 133 | 146 | 2695 | 133 | 8781 | 2209 | 133 | 10000 | 300 |
| 134 | 142 | 2695 | 134 | 8772 | 2212 | 134 | 10000 | 300 |
| 135 | 137 | 2695 | 135 | 8764 | 2214 | 135 | 10000 | 300 |
| 136 | 133 | 2695 | 136 | 8755 | 2217 | 136 | 10000 | 300 |
| 137 | 129 | 2695 | 137 | 8747 | 2219 | 137 | 10000 | 300 |
| 138 | 125 | 2695 | 138 | 8738 | 2221 | 138 | 10000 | 300 |
| 139 | 121 | 2695 | 139 | 8730 | 2224 | 139 | 10000 | 300 |
| 140 | 117 | 2694 | 140 | 8721 | 2226 | 140 | 10000 | 300 |
| 141 | 113 | 2694 | 141 | 8713 | 2228 | 141 | 10000 | 300 |
| 142 | 110 | 2694 | 142 | 8704 | 2230 | 142 | 10000 | 300 |
| 143 | 106 | 2700 | 143 | 8696 | 2233 | 143 | 10000 | 300 |
| 144 | 103 | 2700 | 144 | 8687 | 2235 | 144 | 10000 | 300 |
| 145 | 100 | 2700 | 145 | 8679 | 2237 | 145 | 10000 | 300 |
| 146 | 97 | 2700 | 146 | 8670 | 2239 | 146 | 10000 | 300 |
| 147 | 93 | 2700 | 147 | 8662 | 2241 | 147 | 10000 | 300 |
| 148 | 91 | 2700 | 148 | 8653 | 2244 | 148 | 10000 | 300 |
| 149 | 88 | 2700 | 149 | 8645 | 2246 | 149 | 10000 | 300 |
| 150 | 85 | 2700 | 150 | 8636 | 2248 | 150 | 10000 | 300 |
| 151 | 82 | 2700 | 151 | 8628 | 2250 | 151 | 10000 | 300 |
| 152 | 80 | 2700 | 152 | 8619 | 2252 | 152 | 10000 | 300 |
| 153 | 77 | 2700 | 153 | 8611 | 2254 | 153 | 10000 | 300 |
| 154 | 75 | 2700 | 154 | 8603 | 2256 | 154 | 10000 | 300 |
| 155 | 72 | 2700 | 155 | 8594 | 2258 | 155 | 10000 | 300 |
| 156 | 70 | 2700 | 156 | 8586 | 2260 | 156 | 10000 | 300 |
| 157 | 68 | 2700 | 157 | 8577 | 2262 | 157 | 10000 | 300 |
| 158 | 66 | 2700 | 158 | 8569 | 2264 | 158 | 10000 | 300 |
| 159 | 64 | 2700 | 159 | 8561 | 2266 | 159 | 10000 | 300 |
| 160 | 62 | 2700 | 160 | 8552 | 2268 | 160 | 10000 | 300 |
| 161 | 60 | 2700 | 161 | 8544 | 2270 | 161 | 10000 | 300 |
| 162 | 58 | 2700 | 162 | 8536 | 2272 | 162 | 10000 | 300 |
| 163 | 56 | 2700 | 163 | 8527 | 2274 | 163 | 10000 | 300 |
| 164 | 54 | 2700 | 164 | 8519 | 2276 | 164 | 10000 | 300 |
| 165 | 53 | 2700 | 165 | 8511 | 2278 | 165 | 10000 | 300 |
| 166 | 51 | 2700 | 166 | 8502 | 2279 | 166 | 10000 | 300 |
| 167 | 49 | 2700 | 167 | 8494 | 2281 | 167 | 10000 | 300 |
| 168 | 48 | 2700 | 168 | 8486 | 2283 | 168 | 10000 | 300 |
| 169 | 46 | 2700 | 169 | 8477 | 2285 | 169 | 10000 | 300 |
| 170 | 45 | 2700 | 170 | 8469 | 2287 | 170 | 10000 | 300 |
| 171 | 43 | 2700 | 171 | 8461 | 2288 | 171 | 10000 | 300 |
| 172 | 42 | 2700 | 172 | 8453 | 2290 | 172 | 10000 | 300 |
| 173 | 41 | 2700 | 173 | 8444 | 2292 | 173 | 10000 | 300 |
| 174 | 39 | 2700 | 174 | 8436 | 2294 | 174 | 10000 | 300 |
| 175 | 38 | 2700 | 175 | 8428 | 2295 | 175 | 10000 | 300 |
| 176 | 37 | 2700 | 176 | 8420 | 2297 | 176 | 10000 | 300 |
| 177 | 36 | 2700 | 177 | 8411 | 2299 | 177 | 10000 | 300 |
| 178 | 35 | 2700 | 178 | 8403 | 2300 | 178 | 10000 | 300 |
| 179 | 34 | 2700 | 179 | 8395 | 2302 | 179 | 10000 | 300 |
| 180 | 32 | 2700 | 180 | 8387 | 2304 | 180 | 10000 | 300 |
| 181 | 31 | 2700 | 181 | 8379 | 2306 | 181 | 10000 | 300 |
| 182 | 30 | 2700 | 182 | 8370 | 2307 | 182 | 10000 | 300 |
| 183 | 29 | 2700 | 183 | 8362 | 2309 | 183 | 10000 | 300 |
| 184 | 29 | 2700 | 184 | 8354 | 2310 | 184 | 10000 | 300 |
| 185 | 28 | 2700 | 185 | 8346 | 2312 | 185 | 10000 | 300 |
| 186 | 27 | 2700 | 186 | 8338 | 2314 | 186 | 10000 | 300 |
| 187 | 26 | 2700 | 187 | 8330 | 2315 | 187 | 10000 | 300 |
| 188 | 25 | 2700 | 188 | 8321 | 2317 | 188 | 10000 | 300 |
| 189 | 24 | 2700 | 189 | 8313 | 2318 | 189 | 10000 | 300 |
| 190 | 24 | 2700 | 190 | 8305 | 2320 | 190 | 10000 | 300 |
| 191 | 23 | 2700 | 191 | 8297 | 2321 | 191 | 10000 | 300 |
| 192 | 22 | 2700 | 192 | 8289 | 2323 | 192 | 10000 | 300 |
| 193 | 21 | 2700 | 193 | 8281 | 2324 | 193 | 10000 | 300 |

TABLE 1-continued

| d = 300 ms | | | | | | | | |
|---|---|---|---|---|---|---|---|---|
| d = 300, r = 50.0% | | | d = 300, r = 25.0% | | | d = 300, r = 0.0% | | |
| N | f | g | N | f | g | N | f | g |
| 194 | 21 | 2700 | 194 | 8273 | 2326 | 194 | 10000 | 300 |
| 195 | 20 | 2700 | 195 | 8265 | 2328 | 195 | 10000 | 300 |
| 196 | 19 | 2700 | 196 | 8257 | 2329 | 196 | 10000 | 300 |
| 197 | 19 | 2700 | 197 | 8249 | 2330 | 197 | 10000 | 300 |
| 198 | 18 | 2700 | 198 | 8241 | 2332 | 198 | 10000 | 300 |
| 199 | 18 | 2700 | 199 | 8233 | 2333 | 199 | 10000 | 300 |
| 200 | 17 | 2700 | 200 | 8224 | 2335 | 200 | 10000 | 300 |
| 201 | 16 | 2700 | 201 | 8216 | 2336 | 201 | 10000 | 300 |
| 202 | 16 | 2700 | 202 | 8208 | 2338 | 202 | 10000 | 300 |
| 203 | 15 | 2700 | 203 | 8200 | 2339 | 203 | 10000 | 300 |
| 204 | 15 | 2700 | 204 | 8192 | 2340 | 204 | 10000 | 300 |
| 205 | 14 | 2700 | 205 | 8184 | 2342 | 205 | 10000 | 300 |
| 206 | 14 | 2700 | 206 | 8176 | 2343 | 206 | 10000 | 300 |
| 207 | 13 | 2700 | 207 | 8168 | 2345 | 207 | 10000 | 300 |
| 208 | 13 | 2700 | 208 | 8160 | 2346 | 208 | 10000 | 300 |
| 209 | 13 | 2700 | 209 | 8152 | 2347 | 209 | 10000 | 300 |
| 210 | 12 | 2700 | 210 | 8145 | 2349 | 210 | 10000 | 300 |
| 211 | 12 | 2700 | 211 | 8137 | 2350 | 211 | 10000 | 300 |
| 212 | 11 | 2700 | 212 | 8129 | 2351 | 212 | 10000 | 300 |
| 213 | 11 | 2700 | 213 | 8121 | 2353 | 213 | 10000 | 300 |
| 214 | 11 | 2700 | 214 | 8113 | 2354 | 214 | 10000 | 300 |
| 215 | 10 | 2700 | 215 | 8105 | 2355 | 215 | 10000 | 300 |
| 216 | 10 | 2700 | 216 | 8097 | 2357 | 216 | 10000 | 300 |
| 217 | 10 | 2700 | 217 | 8089 | 2358 | 217 | 10000 | 300 |
| 218 | 9 | 2700 | 218 | 8081 | 2359 | 218 | 10000 | 300 |
| 219 | 9 | 2700 | 219 | 8073 | 2361 | 219 | 10000 | 300 |
| 220 | 9 | 2700 | 220 | 8065 | 2362 | 220 | 10000 | 300 |
| 221 | 8 | 2700 | 221 | 8057 | 2363 | 221 | 10000 | 300 |
| 222 | 8 | 2700 | 222 | 8050 | 2364 | 222 | 10000 | 300 |
| 223 | 8 | 2700 | 223 | 8042 | 2366 | 223 | 10000 | 300 |
| 224 | 8 | 2700 | 224 | 8034 | 2367 | 224 | 10000 | 300 |
| 225 | 7 | 2700 | 225 | 8026 | 2368 | 225 | 10000 | 300 |
| 226 | 7 | 2700 | 226 | 8018 | 2369 | 226 | 10000 | 300 |
| 227 | 7 | 2700 | 227 | 8010 | 2371 | 227 | 10000 | 300 |
| 228 | 7 | 2700 | 228 | 8003 | 2372 | 228 | 10000 | 300 |
| 229 | 6 | 2700 | 229 | 7995 | 2373 | 229 | 10000 | 300 |
| 230 | 6 | 2700 | 230 | 7987 | 2374 | 230 | 10000 | 300 |
| 231 | 6 | 2700 | 231 | 7979 | 2375 | 231 | 10000 | 300 |
| 232 | 6 | 2700 | 232 | 7971 | 2377 | 232 | 10000 | 300 |
| 233 | 6 | 2700 | 233 | 7964 | 2378 | 233 | 10000 | 300 |
| 234 | 5 | 2700 | 234 | 7956 | 2379 | 234 | 10000 | 300 |
| 235 | 5 | 2700 | 235 | 7948 | 2380 | 235 | 10000 | 300 |
| 236 | 5 | 2700 | 236 | 7940 | 2381 | 236 | 10000 | 300 |
| 237 | 5 | 2700 | 237 | 7932 | 2382 | 237 | 10000 | 300 |
| 238 | 5 | 2700 | 238 | 7925 | 2383 | 238 | 10000 | 300 |
| 239 | 5 | 2700 | 239 | 7917 | 2385 | 239 | 10000 | 300 |
| 240 | 4 | 2700 | 240 | 7909 | 2386 | 240 | 10000 | 300 |
| 241 | 4 | 2700 | 241 | 7902 | 2387 | 241 | 10000 | 300 |
| 242 | 4 | 2700 | 242 | 7894 | 2388 | 242 | 10000 | 300 |
| 243 | 4 | 2700 | 243 | 7886 | 2389 | 243 | 10000 | 300 |
| 244 | 4 | 2700 | 244 | 7878 | 2390 | 244 | 10000 | 300 |
| 245 | 4 | 2700 | 245 | 7871 | 2391 | 245 | 10000 | 300 |
| 246 | 4 | 2700 | 246 | 7863 | 2392 | 246 | 10000 | 300 |
| 247 | 3 | 2700 | 247 | 7855 | 2393 | 247 | 10000 | 300 |
| 248 | 3 | 2700 | 248 | 7848 | 2395 | 248 | 10000 | 300 |
| 249 | 3 | 2700 | 249 | 7840 | 2396 | 249 | 10000 | 300 |
| 250 | 3 | 2700 | 250 | 7832 | 2397 | 250 | 10000 | 300 |
| 251 | 3 | 2700 | 251 | 7825 | 2398 | 251 | 10000 | 300 |
| 252 | 3 | 2700 | 252 | 7817 | 2399 | 252 | 10000 | 300 |
| 253 | 3 | 2700 | 253 | 7809 | 2400 | 253 | 10000 | 300 |
| 254 | 3 | 2700 | 254 | 7802 | 2401 | 254 | 10000 | 300 |
| 255 | 3 | 2700 | 255 | 7794 | 2402 | 255 | 10000 | 300 |
| 256 | 2 | 2700 | 256 | 7787 | 2403 | 256 | 10000 | 300 |

TABLE 2

| d = 50 ms | | | | | | | | |
|---|---|---|---|---|---|---|---|---|
| (4) d = 50, r = 50.0% | | | (5) d = 50, r = 25.0% | | | (6) d = 50, r = 0.0% | | |
| N | f | g | N | f | g | N | f | g |
| 1 | 9687 | 133 | 1 | 9990 | 82 | 1 | 10000 | 50 |
| 2 | 9384 | 188 | 2 | 9980 | 109 | 2 | 10000 | 50 |
| 3 | 9091 | 225 | 3 | 9970 | 130 | 3 | 10000 | 50 |
| 4 | 8807 | 252 | 4 | 9960 | 147 | 4 | 10000 | 50 |
| 5 | 8532 | 273 | 5 | 9951 | 161 | 5 | 10000 | 50 |
| 6 | 8265 | 290 | 6 | 9941 | 174 | 6 | 10000 | 50 |
| 7 | 8007 | 303 | 7 | 9931 | 184 | 7 | 10000 | 50 |
| 8 | 7756 | 315 | 8 | 9922 | 193 | 8 | 10000 | 50 |
| 9 | 7514 | 325 | 9 | 9912 | 201 | 9 | 10000 | 50 |
| 10 | 7279 | 333 | 10 | 9902 | 207 | 10 | 10000 | 50 |
| 11 | 7052 | 341 | 11 | 9893 | 214 | 11 | 10000 | 50 |
| 12 | 6831 | 348 | 12 | 9883 | 219 | 12 | 10000 | 50 |
| 13 | 6618 | 354 | 13 | 9873 | 225 | 13 | 10000 | 50 |
| 14 | 6411 | 359 | 14 | 9864 | 229 | 14 | 10000 | 50 |
| 15 | 6211 | 364 | 15 | 9854 | 234 | 15 | 10000 | 50 |
| 16 | 6017 | 369 | 16 | 9844 | 238 | 16 | 10000 | 50 |
| 17 | 5829 | 373 | 17 | 9835 | 242 | 17 | 10000 | 50 |
| 18 | 5646 | 377 | 18 | 9825 | 246 | 18 | 10000 | 50 |
| 19 | 5470 | 381 | 19 | 9816 | 249 | 19 | 10000 | 50 |
| 20 | 5299 | 384 | 20 | 9806 | 252 | 20 | 10000 | 50 |
| 21 | 5133 | 387 | 21 | 9796 | 256 | 21 | 10000 | 50 |
| 22 | 4973 | 390 | 22 | 9787 | 259 | 22 | 10000 | 50 |
| 23 | 4818 | 393 | 23 | 9777 | 262 | 23 | 10000 | 50 |
| 24 | 4667 | 395 | 24 | 9768 | 264 | 24 | 10000 | 50 |
| 25 | 4521 | 397 | 25 | 9758 | 267 | 25 | 10000 | 50 |
| 26 | 4380 | 400 | 26 | 9749 | 270 | 26 | 10000 | 50 |
| 27 | 4243 | 402 | 27 | 9739 | 272 | 27 | 10000 | 50 |
| 28 | 4110 | 404 | 28 | 9730 | 274 | 28 | 10000 | 50 |
| 29 | 3982 | 406 | 29 | 9720 | 277 | 29 | 10000 | 50 |
| 30 | 3857 | 407 | 30 | 9711 | 279 | 30 | 10000 | 50 |
| 31 | 3737 | 409 | 31 | 9701 | 281 | 31 | 10000 | 50 |
| 32 | 3620 | 411 | 32 | 9692 | 283 | 32 | 10000 | 50 |
| 33 | 3507 | 412 | 33 | 9682 | 285 | 33 | 10000 | 50 |
| 34 | 3397 | 414 | 34 | 9673 | 287 | 34 | 10000 | 50 |
| 35 | 3291 | 415 | 35 | 9663 | 289 | 35 | 10000 | 50 |
| 36 | 3188 | 416 | 36 | 9654 | 291 | 36 | 10000 | 50 |
| 37 | 3089 | 417 | 37 | 9644 | 292 | 37 | 10000 | 50 |
| 38 | 2992 | 419 | 38 | 9635 | 294 | 38 | 10000 | 50 |
| 39 | 2899 | 420 | 39 | 9626 | 296 | 39 | 10000 | 50 |
| 40 | 2808 | 421 | 40 | 9616 | 297 | 40 | 10000 | 50 |
| 41 | 2720 | 422 | 41 | 9607 | 299 | 41 | 10000 | 50 |
| 42 | 2635 | 423 | 42 | 9597 | 300 | 42 | 10000 | 50 |
| 43 | 2553 | 424 | 43 | 9588 | 302 | 43 | 10000 | 50 |
| 44 | 2473 | 425 | 44 | 9579 | 303 | 44 | 10000 | 50 |
| 45 | 2396 | 426 | 45 | 9569 | 305 | 45 | 10000 | 50 |
| 46 | 2321 | 426 | 46 | 9560 | 306 | 46 | 10000 | 50 |
| 47 | 2248 | 427 | 47 | 9551 | 307 | 47 | 10000 | 50 |
| 48 | 2178 | 428 | 48 | 9541 | 309 | 48 | 10000 | 50 |
| 49 | 2110 | 429 | 49 | 9532 | 310 | 49 | 10000 | 50 |
| 50 | 2044 | 430 | 50 | 9523 | 311 | 50 | 10000 | 50 |
| 51 | 1980 | 430 | 51 | 9513 | 312 | 51 | 10000 | 50 |
| 52 | 1918 | 431 | 52 | 9504 | 314 | 52 | 10000 | 50 |
| 53 | 1858 | 432 | 53 | 9495 | 315 | 53 | 10000 | 50 |
| 54 | 1800 | 432 | 54 | 9486 | 316 | 54 | 10000 | 50 |
| 55 | 1744 | 433 | 55 | 9476 | 317 | 55 | 10000 | 50 |
| 56 | 1689 | 433 | 56 | 9467 | 318 | 56 | 10000 | 50 |
| 57 | 1637 | 434 | 57 | 9458 | 319 | 57 | 10000 | 50 |
| 58 | 1585 | 434 | 58 | 9449 | 320 | 58 | 10000 | 50 |
| 59 | 1536 | 435 | 59 | 9439 | 321 | 59 | 10000 | 50 |
| 60 | 1488 | 435 | 60 | 9430 | 322 | 60 | 10000 | 50 |
| 61 | 1441 | 436 | 61 | 9421 | 323 | 61 | 10000 | 50 |
| 62 | 1396 | 436 | 62 | 9412 | 324 | 62 | 10000 | 50 |
| 63 | 1353 | 437 | 63 | 9403 | 325 | 63 | 10000 | 50 |
| 64 | 1310 | 437 | 64 | 9393 | 326 | 64 | 10000 | 50 |
| 65 | 1269 | 438 | 65 | 9384 | 327 | 65 | 10000 | 50 |
| 66 | 1230 | 438 | 66 | 9375 | 328 | 66 | 10000 | 50 |
| 67 | 1191 | 438 | 67 | 9366 | 329 | 67 | 10000 | 50 |
| 68 | 1154 | 439 | 68 | 9357 | 330 | 68 | 10000 | 50 |
| 69 | 1118 | 439 | 69 | 9348 | 331 | 69 | 10000 | 50 |
| 70 | 1083 | 439 | 70 | 9338 | 331 | 70 | 10000 | 50 |
| 71 | 1049 | 440 | 71 | 9329 | 332 | 71 | 10000 | 50 |
| 72 | 1016 | 440 | 72 | 9320 | 333 | 72 | 10000 | 50 |
| 73 | 985 | 440 | 73 | 9311 | 334 | 73 | 10000 | 50 |
| 74 | 954 | 441 | 74 | 9302 | 335 | 74 | 10000 | 50 |

TABLE 2-continued

| d = 50 ms | | | | | | | | |
|---|---|---|---|---|---|---|---|---|
| (4) d = 50, r = 50.0% | | | (5) d = 50, r = 25.0% | | | (6) d = 50, r = 0.0% | | |
| N | f | g | N | f | g | N | f | g |
| 75 | 924 | 441 | 75 | 9293 | 335 | 75 | 10000 | 50 |
| 76 | 895 | 441 | 76 | 9284 | 336 | 76 | 10000 | 50 |
| 77 | 867 | 442 | 77 | 9275 | 337 | 77 | 10000 | 50 |
| 78 | 840 | 442 | 78 | 9266 | 338 | 78 | 10000 | 50 |
| 79 | 814 | 442 | 79 | 9257 | 338 | 79 | 10000 | 50 |
| 80 | 788 | 442 | 80 | 9248 | 339 | 80 | 10000 | 50 |
| 81 | 764 | 443 | 81 | 9239 | 340 | 81 | 10000 | 50 |
| 82 | 740 | 443 | 82 | 9230 | 341 | 82 | 10000 | 50 |
| 83 | 717 | 443 | 83 | 9221 | 341 | 83 | 10000 | 50 |
| 84 | 694 | 443 | 84 | 9212 | 342 | 84 | 10000 | 50 |
| 85 | 672 | 443 | 85 | 9203 | 343 | 85 | 10000 | 50 |
| 86 | 651 | 444 | 86 | 9194 | 343 | 86 | 10000 | 50 |
| 87 | 631 | 444 | 87 | 9185 | 344 | 87 | 10000 | 50 |
| 88 | 611 | 444 | 88 | 9176 | 345 | 88 | 10000 | 50 |
| 89 | 592 | 444 | 89 | 9167 | 345 | 89 | 10000 | 50 |
| 90 | 574 | 444 | 90 | 9158 | 346 | 90 | 10000 | 50 |
| 91 | 556 | 444 | 91 | 9149 | 347 | 91 | 10000 | 50 |
| 92 | 538 | 445 | 92 | 9140 | 347 | 92 | 10000 | 50 |
| 93 | 522 | 445 | 93 | 9131 | 348 | 93 | 10000 | 50 |
| 94 | 505 | 445 | 94 | 9122 | 348 | 94 | 10000 | 50 |
| 95 | 489 | 445 | 95 | 9113 | 349 | 95 | 10000 | 50 |
| 96 | 474 | 445 | 96 | 9104 | 350 | 96 | 10000 | 50 |
| 97 | 459 | 445 | 97 | 9095 | 350 | 97 | 10000 | 50 |
| 98 | 445 | 446 | 98 | 9086 | 351 | 98 | 10000 | 50 |
| 99 | 431 | 446 | 99 | 9078 | 351 | 99 | 10000 | 50 |
| 100 | 417 | 446 | 100 | 9069 | 352 | 100 | 10000 | 50 |
| 101 | 404 | 446 | 101 | 9060 | 353 | 101 | 10000 | 50 |
| 102 | 392 | 446 | 102 | 9051 | 353 | 102 | 10000 | 50 |
| 103 | 380 | 446 | 103 | 9042 | 354 | 103 | 10000 | 50 |
| 104 | 368 | 446 | 104 | 9033 | 354 | 104 | 10000 | 50 |
| 105 | 356 | 446 | 105 | 9024 | 355 | 105 | 10000 | 50 |
| 106 | 345 | 447 | 106 | 9016 | 355 | 106 | 10000 | 50 |
| 107 | 334 | 447 | 107 | 9007 | 356 | 107 | 10000 | 50 |
| 108 | 324 | 447 | 108 | 8998 | 356 | 108 | 10000 | 50 |
| 109 | 314 | 447 | 109 | 8989 | 357 | 109 | 10000 | 50 |
| 110 | 304 | 447 | 110 | 8980 | 357 | 110 | 10000 | 50 |
| 111 | 294 | 447 | 111 | 8972 | 358 | 111 | 10000 | 50 |
| 112 | 285 | 447 | 112 | 8963 | 358 | 112 | 10000 | 50 |
| 113 | 276 | 447 | 113 | 8954 | 359 | 113 | 10000 | 50 |
| 114 | 268 | 447 | 114 | 8945 | 359 | 114 | 10000 | 50 |
| 115 | 259 | 448 | 115 | 8937 | 360 | 115 | 10000 | 50 |
| 116 | 251 | 448 | 116 | 8928 | 360 | 116 | 10000 | 50 |
| 117 | 243 | 447 | 117 | 8919 | 361 | 117 | 10000 | 50 |
| 118 | 236 | 448 | 118 | 8911 | 361 | 118 | 10000 | 50 |
| 119 | 228 | 448 | 119 | 8902 | 362 | 119 | 10000 | 50 |
| 120 | 221 | 448 | 120 | 8893 | 362 | 120 | 10000 | 50 |
| 121 | 214 | 448 | 121 | 8884 | 363 | 121 | 10000 | 50 |
| 122 | 207 | 448 | 122 | 8876 | 363 | 122 | 10000 | 50 |
| 123 | 201 | 448 | 123 | 8867 | 364 | 123 | 10000 | 50 |
| 124 | 195 | 448 | 124 | 8858 | 364 | 124 | 10000 | 50 |
| 125 | 189 | 448 | 125 | 8850 | 364 | 125 | 10000 | 50 |
| 126 | 183 | 448 | 126 | 8841 | 365 | 126 | 10000 | 50 |
| 127 | 177 | 448 | 127 | 8833 | 365 | 127 | 10000 | 50 |
| 128 | 171 | 448 | 128 | 8824 | 366 | 128 | 10000 | 50 |
| 129 | 166 | 448 | 129 | 8815 | 366 | 129 | 10000 | 50 |
| 130 | 161 | 448 | 130 | 8807 | 367 | 130 | 10000 | 50 |
| 131 | 156 | 448 | 131 | 8798 | 367 | 131 | 10000 | 50 |
| 132 | 151 | 449 | 132 | 8790 | 367 | 132 | 10000 | 50 |
| 133 | 146 | 449 | 133 | 8781 | 368 | 133 | 10000 | 50 |
| 134 | 142 | 449 | 134 | 8772 | 368 | 134 | 10000 | 50 |
| 135 | 137 | 449 | 135 | 8764 | 369 | 135 | 10000 | 50 |
| 136 | 133 | 449 | 136 | 8755 | 369 | 136 | 10000 | 50 |
| 137 | 129 | 449 | 137 | 8747 | 369 | 137 | 10000 | 50 |
| 138 | 125 | 449 | 138 | 8738 | 370 | 138 | 10000 | 50 |
| 139 | 121 | 449 | 139 | 8730 | 370 | 139 | 10000 | 50 |
| 140 | 117 | 449 | 140 | 8721 | 371 | 140 | 10000 | 50 |
| 141 | 113 | 449 | 141 | 8713 | 371 | 141 | 10000 | 50 |
| 142 | 110 | 449 | 142 | 8704 | 371 | 142 | 10000 | 50 |
| 143 | 106 | 450 | 143 | 8696 | 372 | 143 | 10000 | 50 |
| 144 | 103 | 450 | 144 | 8687 | 372 | 144 | 10000 | 50 |
| 145 | 100 | 450 | 145 | 8679 | 372 | 145 | 10000 | 50 |
| 146 | 97 | 450 | 146 | 8670 | 373 | 146 | 10000 | 50 |
| 147 | 93 | 450 | 147 | 8662 | 373 | 147 | 10000 | 50 |
| 148 | 91 | 450 | 148 | 8653 | 374 | 148 | 10000 | 50 |

TABLE 2-continued

| d = 50 ms | | | | | | | | |
|---|---|---|---|---|---|---|---|---|
| (4) d = 50, r = 50.0% | | | (5) d = 50, r = 25.0% | | | (6) d = 50, r = 0.0% | | |
| N | f | g | N | f | g | N | f | g |
| 149 | 88 | 450 | 149 | 8645 | 374 | 149 | 10000 | 50 |
| 150 | 85 | 450 | 150 | 8636 | 374 | 150 | 10000 | 50 |
| 151 | 82 | 450 | 151 | 8628 | 375 | 151 | 10000 | 50 |
| 152 | 80 | 450 | 152 | 8619 | 375 | 152 | 10000 | 50 |
| 153 | 77 | 450 | 153 | 8611 | 375 | 153 | 10000 | 50 |
| 154 | 75 | 450 | 154 | 8603 | 376 | 154 | 10000 | 50 |
| 155 | 72 | 450 | 155 | 8594 | 376 | 155 | 10000 | 50 |
| 156 | 70 | 450 | 156 | 8586 | 376 | 156 | 10000 | 50 |
| 157 | 68 | 450 | 157 | 8577 | 377 | 157 | 10000 | 50 |
| 158 | 66 | 450 | 158 | 8569 | 377 | 158 | 10000 | 50 |
| 159 | 64 | 450 | 159 | 8561 | 377 | 159 | 10000 | 50 |
| 160 | 62 | 450 | 160 | 8552 | 378 | 160 | 10000 | 50 |
| 161 | 60 | 450 | 161 | 8544 | 378 | 161 | 10000 | 50 |
| 162 | 58 | 450 | 162 | 8536 | 378 | 162 | 10000 | 50 |
| 163 | 56 | 450 | 163 | 8527 | 379 | 163 | 10000 | 50 |
| 164 | 54 | 450 | 164 | 8519 | 379 | 164 | 10000 | 50 |
| 165 | 53 | 450 | 165 | 8511 | 379 | 165 | 10000 | 50 |
| 166 | 51 | 450 | 166 | 8502 | 379 | 166 | 10000 | 50 |
| 167 | 49 | 450 | 167 | 8494 | 380 | 167 | 10000 | 50 |
| 168 | 48 | 450 | 168 | 8486 | 380 | 168 | 10000 | 50 |
| 169 | 46 | 450 | 169 | 8477 | 380 | 169 | 10000 | 50 |
| 170 | 45 | 450 | 170 | 8469 | 381 | 170 | 10000 | 50 |
| 171 | 43 | 450 | 171 | 8461 | 381 | 171 | 10000 | 50 |
| 172 | 42 | 450 | 172 | 8453 | 381 | 172 | 10000 | 50 |
| 173 | 41 | 450 | 173 | 8444 | 382 | 173 | 10000 | 50 |
| 174 | 39 | 450 | 174 | 8436 | 382 | 174 | 10000 | 50 |
| 175 | 38 | 450 | 175 | 8428 | 382 | 175 | 10000 | 50 |
| 176 | 37 | 450 | 176 | 8420 | 382 | 176 | 10000 | 50 |
| 177 | 36 | 450 | 177 | 8411 | 383 | 177 | 10000 | 50 |
| 178 | 35 | 450 | 178 | 8403 | 383 | 178 | 10000 | 50 |
| 179 | 34 | 450 | 179 | 8395 | 383 | 179 | 10000 | 50 |
| 180 | 32 | 450 | 180 | 8387 | 384 | 180 | 10000 | 50 |
| 181 | 31 | 450 | 181 | 8379 | 384 | 181 | 10000 | 50 |
| 182 | 30 | 450 | 182 | 8370 | 384 | 182 | 10000 | 50 |
| 183 | 29 | 450 | 183 | 8362 | 384 | 183 | 10000 | 50 |
| 184 | 29 | 450 | 184 | 8354 | 385 | 184 | 10000 | 50 |
| 185 | 28 | 450 | 185 | 8346 | 385 | 185 | 10000 | 50 |
| 186 | 27 | 450 | 186 | 8338 | 385 | 186 | 10000 | 50 |
| 187 | 26 | 450 | 187 | 8330 | 385 | 187 | 10000 | 50 |
| 188 | 25 | 450 | 188 | 8321 | 386 | 188 | 10000 | 50 |
| 189 | 24 | 450 | 189 | 8313 | 386 | 189 | 10000 | 50 |
| 190 | 24 | 450 | 190 | 8305 | 386 | 190 | 10000 | 50 |
| 191 | 23 | 450 | 191 | 8297 | 386 | 191 | 10000 | 50 |
| 192 | 22 | 450 | 192 | 8289 | 387 | 192 | 10000 | 50 |
| 193 | 21 | 450 | 193 | 8281 | 387 | 193 | 10000 | 50 |
| 194 | 21 | 450 | 194 | 8273 | 387 | 194 | 10000 | 50 |
| 195 | 20 | 450 | 195 | 8265 | 388 | 195 | 10000 | 50 |
| 196 | 19 | 450 | 196 | 8257 | 388 | 196 | 10000 | 50 |
| 197 | 19 | 450 | 197 | 8249 | 388 | 197 | 10000 | 50 |
| 198 | 18 | 450 | 198 | 8241 | 388 | 198 | 10000 | 50 |
| 199 | 18 | 450 | 199 | 8233 | 388 | 199 | 10000 | 50 |
| 200 | 17 | 450 | 200 | 8224 | 389 | 200 | 10000 | 50 |
| 201 | 16 | 450 | 201 | 8216 | 389 | 201 | 10000 | 50 |
| 202 | 16 | 450 | 202 | 8208 | 389 | 202 | 10000 | 50 |
| 203 | 15 | 450 | 203 | 8200 | 389 | 203 | 10000 | 50 |
| 204 | 15 | 450 | 204 | 8192 | 390 | 204 | 10000 | 50 |
| 205 | 14 | 450 | 205 | 8184 | 390 | 205 | 10000 | 50 |
| 206 | 14 | 450 | 206 | 8176 | 390 | 206 | 10000 | 50 |
| 207 | 13 | 450 | 207 | 8168 | 390 | 207 | 10000 | 50 |
| 208 | 13 | 450 | 208 | 8160 | 391 | 208 | 10000 | 50 |
| 209 | 13 | 450 | 209 | 8152 | 391 | 209 | 10000 | 50 |
| 210 | 12 | 450 | 210 | 8145 | 391 | 210 | 10000 | 50 |
| 211 | 12 | 450 | 211 | 8137 | 391 | 211 | 10000 | 50 |
| 212 | 11 | 450 | 212 | 8129 | 391 | 212 | 10000 | 50 |
| 213 | 11 | 450 | 213 | 8121 | 392 | 213 | 10000 | 50 |
| 214 | 11 | 450 | 214 | 8113 | 392 | 214 | 10000 | 50 |
| 215 | 10 | 450 | 215 | 8105 | 392 | 215 | 10000 | 50 |
| 216 | 10 | 450 | 216 | 8097 | 392 | 216 | 10000 | 50 |
| 217 | 10 | 450 | 217 | 8089 | 393 | 217 | 10000 | 50 |
| 218 | 9 | 450 | 218 | 8081 | 393 | 218 | 10000 | 50 |
| 219 | 9 | 450 | 219 | 8073 | 393 | 219 | 10000 | 50 |
| 220 | 9 | 450 | 220 | 8065 | 393 | 220 | 10000 | 50 |
| 221 | 8 | 450 | 221 | 8057 | 393 | 221 | 10000 | 50 |
| 222 | 8 | 450 | 222 | 8050 | 394 | 222 | 10000 | 50 |

TABLE 2-continued

| | | | d = 50 ms | | | | | |
|---|---|---|---|---|---|---|---|---|
| (4) d = 50, r = 50.0% | | | (5) d = 50, r = 25.0% | | | (6) d = 50, r = 0.0% | | |
| N | f | g | N | f | g | N | f | g |
| 223 | 8 | 450 | 223 | 8042 | 394 | 223 | 10000 | 50 |
| 224 | 8 | 450 | 224 | 8034 | 394 | 224 | 10000 | 50 |
| 225 | 7 | 450 | 225 | 8026 | 394 | 225 | 10000 | 50 |
| 226 | 7 | 450 | 226 | 8018 | 394 | 226 | 10000 | 50 |
| 227 | 7 | 450 | 227 | 8010 | 395 | 227 | 10000 | 50 |
| 228 | 7 | 450 | 228 | 8003 | 395 | 228 | 10000 | 50 |
| 229 | 6 | 450 | 229 | 7995 | 395 | 229 | 10000 | 50 |
| 230 | 6 | 450 | 230 | 7987 | 395 | 230 | 10000 | 50 |
| 231 | 6 | 450 | 231 | 7979 | 395 | 231 | 10000 | 50 |
| 232 | 6 | 450 | 232 | 7971 | 396 | 232 | 10000 | 50 |
| 233 | 6 | 450 | 233 | 7964 | 396 | 233 | 10000 | 50 |
| 234 | 5 | 450 | 234 | 7956 | 396 | 234 | 10000 | 50 |
| 235 | 5 | 450 | 235 | 7948 | 396 | 235 | 10000 | 50 |
| 236 | 5 | 450 | 236 | 7940 | 396 | 236 | 10000 | 50 |
| 237 | 5 | 450 | 237 | 7932 | 397 | 237 | 10000 | 50 |
| 238 | 5 | 450 | 238 | 7925 | 397 | 238 | 10000 | 50 |
| 239 | 5 | 450 | 239 | 7917 | 397 | 239 | 10000 | 50 |
| 240 | 4 | 450 | 240 | 7909 | 397 | 240 | 10000 | 50 |
| 241 | 4 | 450 | 241 | 7902 | 397 | 241 | 10000 | 50 |
| 242 | 4 | 450 | 242 | 7894 | 398 | 242 | 10000 | 50 |
| 243 | 4 | 450 | 243 | 7886 | 398 | 243 | 10000 | 50 |
| 244 | 4 | 450 | 244 | 7878 | 398 | 244 | 10000 | 50 |
| 245 | 4 | 450 | 245 | 7871 | 398 | 245 | 10000 | 50 |
| 246 | 4 | 450 | 246 | 7863 | 398 | 246 | 10000 | 50 |
| 247 | 3 | 450 | 247 | 7855 | 398 | 247 | 10000 | 50 |
| 248 | 3 | 450 | 248 | 7848 | 399 | 248 | 10000 | 50 |
| 249 | 3 | 450 | 249 | 7840 | 399 | 249 | 10000 | 50 |
| 250 | 3 | 450 | 250 | 7832 | 399 | 250 | 10000 | 50 |
| 251 | 3 | 450 | 251 | 7825 | 399 | 251 | 10000 | 50 |
| 252 | 3 | 450 | 252 | 7817 | 399 | 252 | 10000 | 50 |
| 253 | 3 | 450 | 253 | 7809 | 400 | 253 | 10000 | 50 |
| 254 | 3 | 450 | 254 | 7802 | 400 | 254 | 10000 | 50 |
| 255 | 3 | 450 | 255 | 7794 | 400 | 255 | 10000 | 50 |
| 256 | 2 | 450 | 256 | 7787 | 400 | 256 | 10000 | 50 |

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A video codec performance evaluation system for evaluating the performance of a video codec in real-time communication (RTC) use cases, said video codec performance evaluation system comprising:

(1) a video codec performance evaluation network model adapted to assess a video codec's performance relative to a reference video codec, said video codec including a video encoder and a video decoder, said video codec performance evaluation network model adapted to:

a. build a set of f-g lookup tables including packet loss ratio values, network latency values, retransmission values, arriving probability values and expected arriving delay values;

b. determine a set of quantization parameter values;

c. determine a set of seeds for random number generation; and d. for each value within said set of quantization parameter values and each value within said set of seeds, determine a set of frame decoding data items for a video sequence, thereby forming a list of sets of frames decoding data items, said video sequence including a set of frames; and (2) a video codec quality analyzer adapted to:

a. from each set of frame decoding data items within said list of sets of frame decoding data items, i. determine a decodable frame ratio, thereby forming a list of decodable frame ratios;

ii. determine a delay of decodable frames, thereby forming a list of delays of decodable frames; and iii. determine a video fluency, thereby forming a list of video fluencies;

b. from said list of decodable frame ratios, determine a final decodable frame ratio;

c. from said list of delays of decodable frames, determine a final delay of decodable frames; and d. from said list of video fluencies, determine a final video fluency.

2. The video codec performance evaluation system of claim 1 wherein said video codec performance evaluation network model determines a set of frame decoding data items by, for each frame within said set of frames:

(1) determining a sending timestamp;

(2) retrieving an encoded bitstream of said frame from said video encoder;

(3) splitting said encoded bitstream into a set of units;

(4) packetizing each unit into a set of packets;

(5) for each unit within said set of units, a. determining an arriving probability value from said set of f-g lookup tables;

b. determining an expected arriving delay value from said set of f-g lookup tables;

c. generating a random number;

d. comparing said random number with said arriving probability value to determine said unit is received or lost; and (6) determining a receiving timestamp;

(7) when all units of said frame are received and said frame is decodable, recording a frame decoding data item indicating said frame receiving timestamp and that said frame is decodable; and (8) when not all units of said frame are received or said frame is not decodable, recording a frame decoding data item indicating said frame receiving timestamp and that said frame is not decodable.

3. The video codec performance evaluation system of claim 2 wherein said video codec performance evaluation network model determines a set of frame decoding data items further by:

(1) from each set of frame decoding data items within said list of sets of frame decoding data items, determining a maximum delay of decodable frames, thereby forming a list of maximum delays of decodable frames; and (2) from said list of maximum delays of decodable frames, determining a final maximum delay of decodable frames.

4. The video codec performance evaluation system of claim 2 wherein said arriving probability values and said expected arriving delay values in said f-g lookup tables are determined using respective formulas below:

$$f(r, s, N) = \text{floor}\left(10000(1 - r^{s+1})^N\right)$$

$$g(r, d, s, N) =$$

$$\text{floor}\left(\frac{\left(\sum_{i=1}^{s}(f(r, i, N) - f(r, i-1, N))(2i+1) + f(r, 0, N)\right)d}{f(r, s, N)}\right)$$

wherein r stands for a predetermined packet loss ratio, d stands for a predetermined network latency, s stands for a predetermined number of retransmissions, and N stands for the number of packets within said unit.

5. The video codec performance evaluation system of claim 4 wherein:

(1) each frame decoding data item within said set of frame decoding data items indicates said receiving timestamp and whether said frame is decodable or not;

(2) said decodable frame ratio is ratio between the number of frames within said set of frames and the number frames within said set of frames that are decodable;

(3) said delay of decodable frames is determined using a formula below:

$$\frac{\sum_{i=1}^{N_D}\left(t_r^{k_i} - t_s^{k_i}\right)}{N_D}$$

wherein, $$t_r^{k_i}$$

stands for the receiving timestamp of the frame $k_i$, $$k_i, t_s^{k_i}$$

stands for the sending timestamp of the frame $k_i$ and $N_D$ stands for the number of decodable frames within the set of frames;

(4) said video fluency is determined using a formula below:

$$\frac{\sum_{i=1}^{N_D-1}\left(t_r^{k_{i+1}} - \left(t_r^{k_i} + \frac{1}{fps}\right)\right)^2 + \left(t_r^{k_1} - t_r^1\right)^2 + \left(t_r^{N_E} - t_r^{k_{N_D}}\right)^2}{N_E}$$

wherein fps stands for the number of frames per second and $N_E$ stands for the number of decodable frames within the set of frames;

(5) said receiving timestamp is determined using a formula below:

$$t_r^n = t_s^n + \max_{0 \le m < M} g(r, d, s, N_m)$$

wherein n stands for the index number of the frame within the set of frames.

6. The video codec performance evaluation system of claim 5 wherein said video codec performance evaluation network model determines a set of frame decoding data items further by:

(1) retrieving a video frame decoding feedback of a processed frame;

(2) determining whether to forward said video frame decoding feedback to said video encoder that encodes said frame; and (3) forwarding said video frame decoding feedback to said video encoder.

7. The video codec performance evaluation system of claim 6 wherein said video frame decoding feedback is forwarded to said video encoder when $$t_r^k + d < t_s^n.$$

8. The video codec performance evaluation system of claim 2 wherein said video codec performance evaluation network model determines a set of frame decoding data items further by:

(1) retrieving a video frame decoding feedback of a processed frame;

(2) determining whether to forward said video frame decoding feedback to said video encoder that encodes said frame; and (3) forwarding said video frame decoding feedback to said video encoder.

9. The video codec performance evaluation system of claim 5 wherein said video codec performance evaluation network model determines a set of frame decoding data items further by:

(1) from each set of frame decoding data items within said list of sets of frame decoding data items, determining a maximum delay of decodable frames, thereby forming a list of maximum delays of decodable frames; and (2) from said list of maximum delays of decodable frames, determining a final maximum delay of decodable frames.

10. The video codec performance evaluation system of claim 9 wherein said maximum delay of decodable frames is determined using a formula below:

$$\max_{1 \le i \le N_D}\left(t_r^{k_i} - t_s^{k_i}\right).$$

11. The video codec performance evaluation system of claim 5 wherein said final decodable frame ratio is an average of decodable frame ratios within said list of decodable frame ratios.

12. The video codec performance evaluation system of claim 5 wherein said final delay of decodable frames is an average of delays of decodable frames within said list of delays of decodable frames.

13. The video codec performance evaluation system of claim 5 wherein said final video fluency is an average of final video fluencies within said list of video fluencies.

14. The video codec performance evaluation system of claim 2 wherein said final decodable frame ratio is an average of decodable frame ratios within said list of decodable frame ratios.

15. The video codec performance evaluation system of claim 2 wherein said final delay of decodable frames is an average of delays of decodable frames within said list of delays of decodable frames.

16. The video codec performance evaluation system of claim 2 wherein said final video fluency is an average of final video fluencies within said list of video fluencies.

17. The video codec performance evaluation system of claim 8 wherein said video codec performance evaluation network model determines a set of frame decoding data items further by:

(1) from each set of frame decoding data items within said list of sets of frame decoding data items, determining a maximum delay of decodable frames, thereby forming a list of maximum delays of decodable frames; and (2) from said list of maximum delays of decodable frames, determining a final maximum delay of decodable frames.

\* \* \* \* \*